US007149829B2

(12) United States Patent
Weber et al.

(10) Patent No.: US 7,149,829 B2
(45) Date of Patent: *Dec. 12, 2006

(54) VARIOUS METHODS AND APPARATUSES FOR ARBITRATION AMONG BLOCKS OF FUNCTIONALITY

(75) Inventors: Wolf-Dietrich Weber, San Jose, CA (US); Ian Andrew Swarbrick, Sunnyvale, CA (US); Jay S. Tomlinson, San Jose, CA (US)

(73) Assignee: Sonics, Inc., Mountain View, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 10/418,370

(22) Filed: Apr. 18, 2003

(65) Prior Publication Data

US 2004/0210695 A1    Oct. 21, 2004

(51) Int. Cl.
*G06F 12/00* (2006.01)
(52) U.S. Cl. ...................................................... 710/243
(58) Field of Classification Search ................ 710/107, 710/111, 113–117, 119–124, 240–244, 309
See application file for complete search history.

(56) References Cited

U.S. PATENT DOCUMENTS

| 5,274,783 | A | | 12/1993 | House et al. | |
|---|---|---|---|---|---|
| 5,754,800 | A | * | 5/1998 | Lentz et al. | 710/116 |
| 5,832,278 | A | * | 11/1998 | Pham | 710/243 |
| 5,948,089 | A | | 9/1999 | Wingard et al. | |
| 6,012,116 | A | | 1/2000 | Aybay et al. | |
| 6,021,450 | A | | 2/2000 | Yoshizawa et al. | |
| 6,092,158 | A | | 7/2000 | Ajanovic et al. | |
| 6,141,713 | A | * | 10/2000 | Kang | 710/107 |
| 6,145,040 | A | * | 11/2000 | LaBerge et al. | 710/107 |
| 6,175,886 | B1 | | 1/2001 | Usami | |
| 6,182,183 | B1 | | 1/2001 | Wingard et al. | |
| 6,330,225 | B1 | | 12/2001 | Weber et al. | |

(Continued)

FOREIGN PATENT DOCUMENTS

EP    0374 521    6/1990

(Continued)

OTHER PUBLICATIONS

Sgroi, M., et al., "Addressing the System-on-a-Chip Interconnect Woes Through Communication-Based Design," University-of California at Berkeley, Princeton University, DAC 2001, Jun. 18-22, 2001, Las Vegas, Nevada, (7 pgs).

(Continued)

*Primary Examiner*—Khanh Dang
(74) *Attorney, Agent, or Firm*—Blakely, Sokoloff, Taylor & Zafman LLP

(57) ABSTRACT

Various methods and apparatuses are described in which an arbitration controller cooperates with arbitration logic. The arbitration controller has a plurality of inputs that receive one or more transactions from a plurality of blocks of functionality. The arbitration controller arbitrates requests for access to a shared resource amongst the plurality of blocks of functionality by implementing an arbitration policy. The arbitration policy groups the transactions from the plurality of blocks of functionality into global groups of transactions for servicing by that shared resource. All of the transactions in a first global group are serviced by that shared resource prior to servicing transactions in a next global group of transactions. The arbitration logic facilitates the arbitration policy. The arbitration logic includes cascaded arbitration units that hierarchically arbitrate for the shared resource. The topology of the functional blocks supplying the transactions to the inputs into the arbitration controller is capable of varying independently of the arbitration policy achieved by the collection of arbitration units.

34 Claims, 16 Drawing Sheets

U.S. PATENT DOCUMENTS

| | | | |
|---|---|---|---|
| 6,493,776 | B1 | 12/2002 | Courtright et al. |
| 6,532,509 | B1* | 3/2003 | Wolrich et al. ............. 710/240 |
| 6,578,117 | B1 | 6/2003 | Weber |
| 6,782,441 | B1* | 8/2004 | Nguyen et al. ............. 710/240 |
| 6,823,411 | B1* | 11/2004 | Hofmann et al. ........... 710/110 |
| 6,898,649 | B1* | 5/2005 | Goudie ....................... 710/112 |
| 6,970,454 | B1 | 11/2005 | Purcell et al. |
| 6,976,106 | B1 | 12/2005 | Tomlinson et al. |
| 2001/0010066 | A1 | 7/2001 | Collins et al. |
| 2002/0138677 | A1 | 9/2002 | Brock et al. |
| 2002/0169935 | A1 | 11/2002 | Rogers et al. |
| 2003/0074520 | A1 | 4/2003 | Weber |
| 2004/0042481 | A1* | 3/2004 | Kurupati ..................... 370/461 |
| 2004/0210696 | A1 | 10/2004 | Meyer et al. |

FOREIGN PATENT DOCUMENTS

| | | |
|---|---|---|
| EP | 1 091 301 A2 | 4/2001 |
| WO | WO 00/29961 | 5/2000 |

OTHER PUBLICATIONS

Telecommunications Protocol and Design by Spragins (ISBN: 0-21-09290-5, Jul. 1992).

Goossens et al., "Guaranteering the Quality of Services in Networks on Chip", Philips Research Laboratories, Eindhoven, The Netherlands Technical University of Eindhoven, Eindhoven, The Netherlands, In Axel Jantsch and Hannu Tenhunen, editors, Networks on Chip. Kluwer, Chapter 4, Mar. 2003, pp. 61-82.

International Search Report for International Application No. PCT/US2004/010864, mailed on Jan. 18, 2005, pp. 7 total.

Drew Wingard, Sonics, Inc., "Sonics SOC Integration Architecture", P1500 Presentation, Jan. 28, 1999, pp. 1-25.

Wolf-Dietrich Weber, Sonics, Inc., "Efficient Shared DRAM Subsystems for SOC's", Systems on IC's, www.sonicsinc.com, Copyright 2001, Sonics, Inc., pp. 1-6.

OCP International Partnership, "Open Core Protocol Specification", Release 1.0 OCP-IP Confidential, Document Revision 1.1.1, Copyright 2001, pp. 184 total.

* cited by examiner

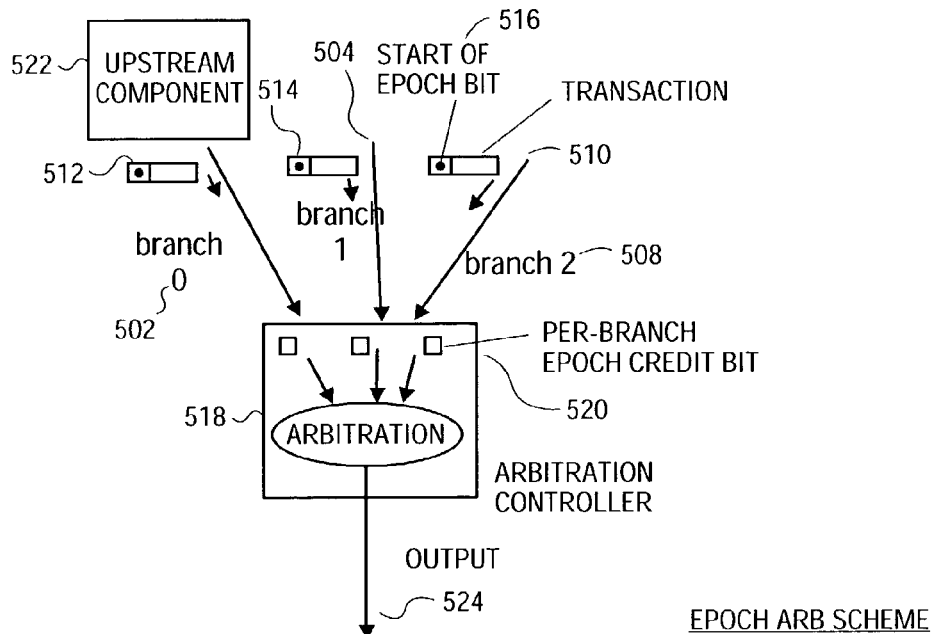
FIG. 5    EPOCH ARB SCHEME
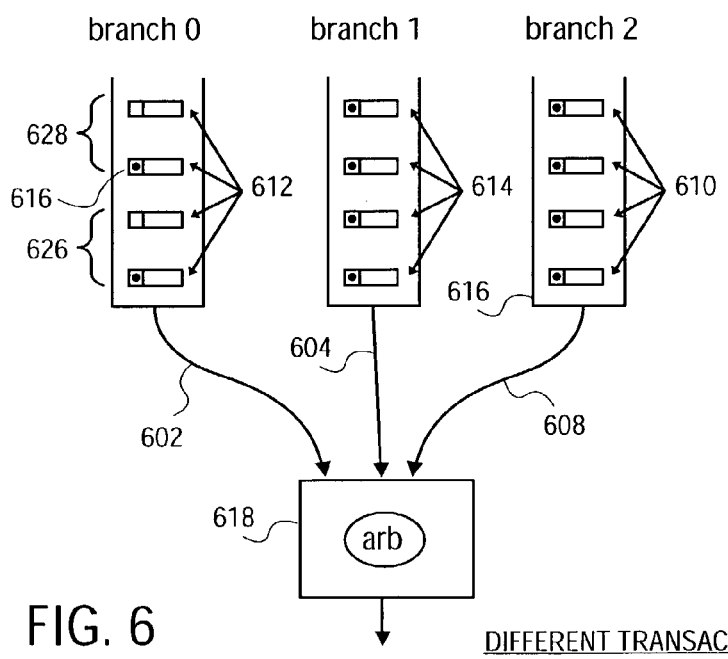
FIG. 6    DIFFERENT TRANSACTION GROUP SIZES cascaded arbitration units balanced tree unbalanced tree Thread priority levels for quality-of-service

|  | br₀ | br₁ | br₂ | br₃ |
|---|---|---|---|---|
| br₀ | - | 1 | 1 | 1 |
| br₁ | 0 | - | 1 | 1 |
| br₂ | 0 | 0 | - | 1 |
| br₃ | 0 | 0 | 0 | - | oldest br₃  br₂  br₁  youngest br₀

VARIOUS METHODS AND APPARATUSES FOR ARBITRATION AMONG BLOCKS OF FUNCTIONALITY

NOTICE OF COPYRIGHT

A portion of the disclosure of this patent document contains material that is subject to copyright protection. The copyright owner has no objection to the facsimile reproduction by anyone of the text and drawings, as they appear in the Patent and Trademark Office Patent file or records, but otherwise reserves all copyright rights whatsoever.

BACKGROUND OF THE INVENTION

In prior approaches, the arbitration mechanism is often centralized and cannot be distributed physically or into different clock cycles. If pipeline points separate multiple arbitration points, the arbitration policy is often dependent on the physical distribution of the arbitration points. This makes it difficult to change the physical distribution, such as might happen during the late stages of chip physical layout, without changing the logic implementing the arbitration policy.

Adding quality-of-service features and/or multi-threading can complicate the arbitration mechanism and can make it much slower.

SUMMARY OF THE INVENTION

Various methods and apparatuses are described in which an arbitration controller cooperates with arbitration logic. The arbitration controller has a plurality of inputs that receive one or more transactions from a plurality of blocks of functionality. The arbitration controller arbitrates requests for access to a shared resource amongst the plurality of blocks of functionality by implementing an arbitration policy. The arbitration policy groups the transactions from the plurality of blocks of functionality into global groups of transactions for servicing by that shared resource. All of the transactions in a first global group are serviced by that shared resource prior to servicing transactions in a next global group of transactions. The arbitration logic facilitates the arbitration policy. The arbitration logic includes cascaded arbitration units that hierarchically arbitrate for the shared resource. The topology of the functional blocks supplying the transactions to the inputs into the arbitration controller is capable of varying independently of the arbitration policy achieved by the collection of arbitration units.

BRIEF DESCRIPTION OF THE DRAWINGS

The drawings refer to embodiments of the invention in which:

FIG. 5 illustrates a block diagram of an embodiment of an arbitration controller having a plurality of inputs that receive one or more transactions from a plurality of blocks of functionality;

FIG. 6 illustrates a block diagram of an embodiment of an arbitration controller receiving transactions of different sized groups from the blocks of functionality;

Figure 1:
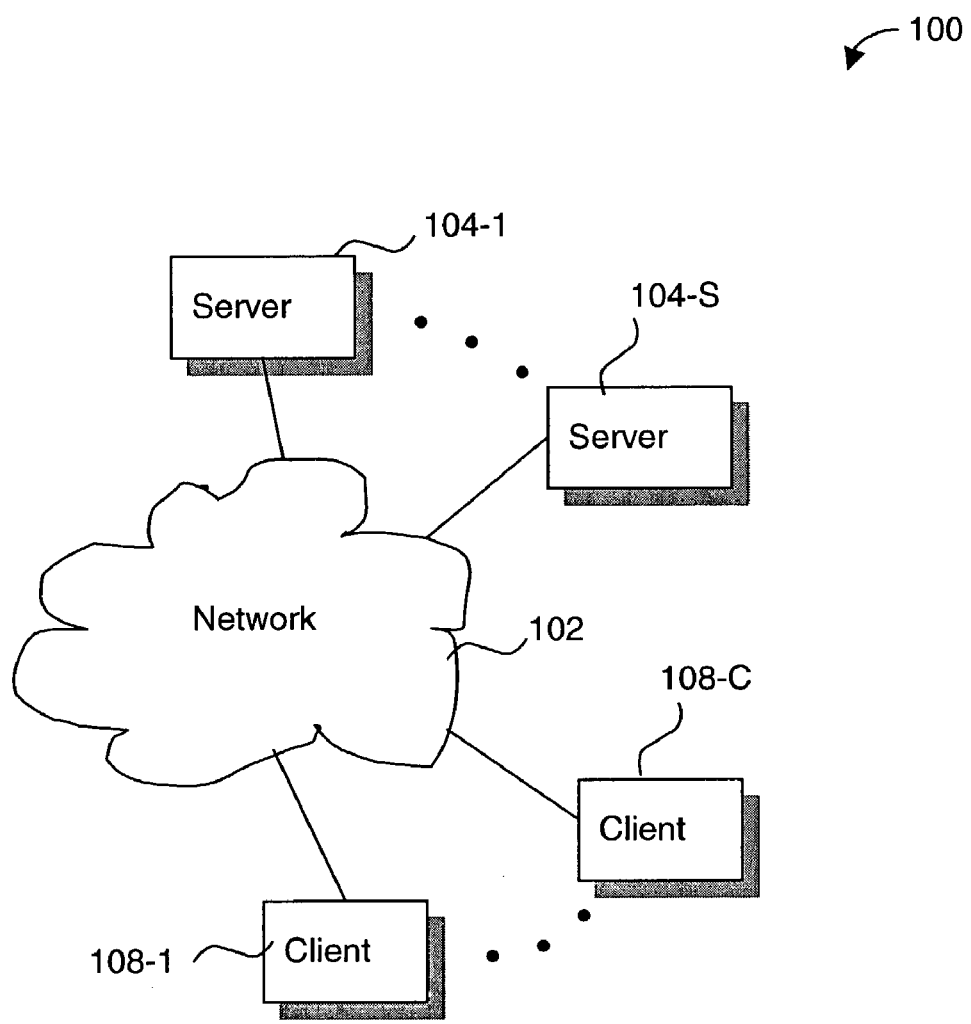
FIG. 1 illustrates a block diagram of an embodiment of a network environment in which the method and apparatus of the present invention may be implemented.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number and type of logic circuits making up arbitration logic, number of branches and/or different numbers of threads on each branch, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In general, various methods and apparatus are described in which an arbitration mechanism arbitrates amongst several contenders for access to a shared resource such as a shared interconnect link or a shared target. The arbitration mechanism may have a structure so as to allow physical distribution of the arbitration points to vary independently of the arbitration policy itself. In addition, the arbitration mechanism may include support for quality-of-service features and multi-threaded links. The arbitration logic of the arbitration mechanism can be optimized to include all of the above features while still providing very fast logic, in order to minimize the arbitration delay.

FIG. 1 illustrates a block diagram of an embodiment of a network environment in which the method and apparatus of the present invention may be implemented. The network environment 100 has a network 102 that connects S servers 104-1 through 104-S, and C clients 108-1 through 108-C. More details are described below.

Figure 2:
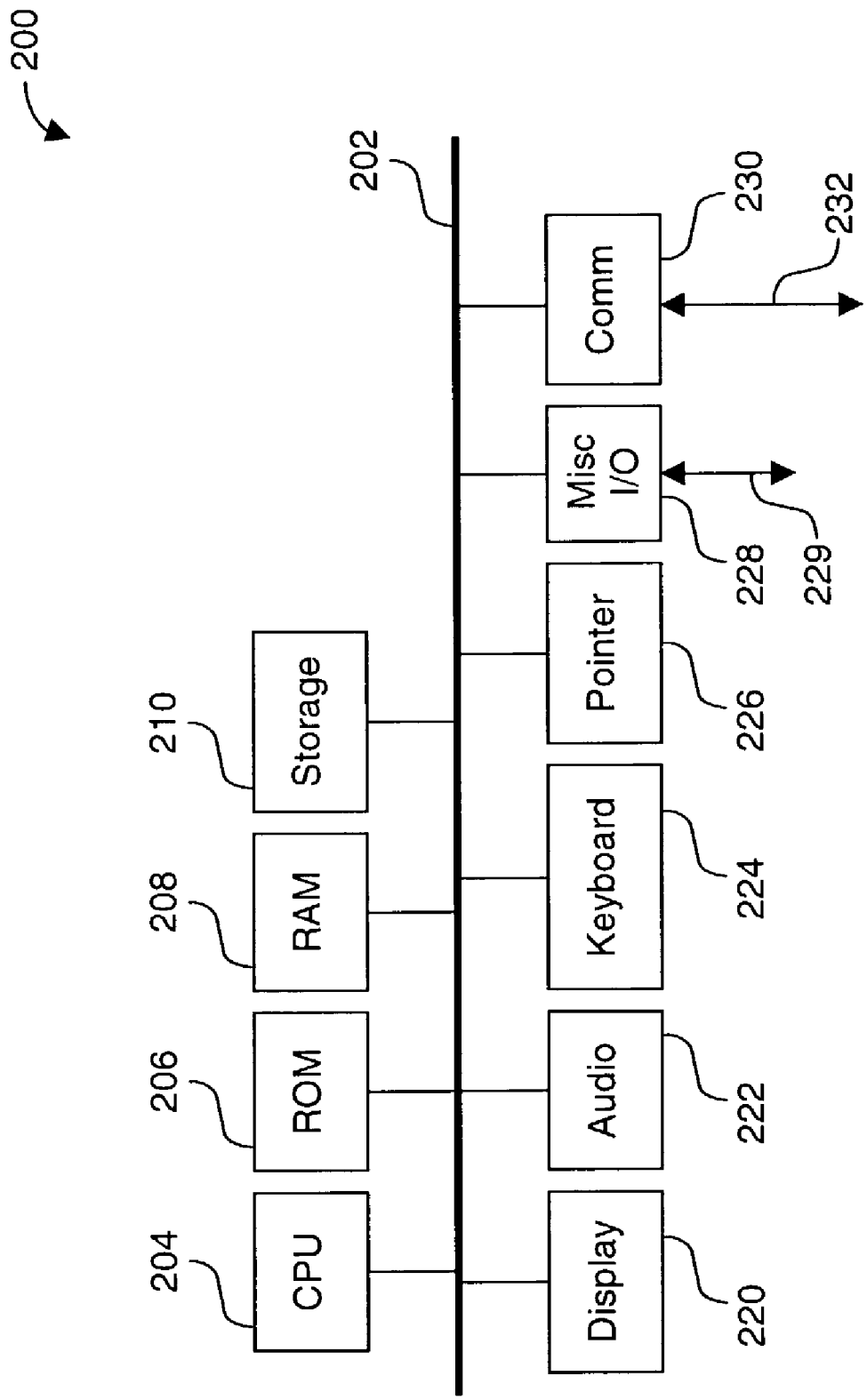
FIG. 2 illustrates a block diagram of an embodiment of a computer system in which the method and apparatus of the present invention may be implemented.

FIG. 2 illustrates a block diagram of an embodiment of a computer system. The computer system 200 in block diagram form, which may be representative of any of the clients and/or servers shown in FIG. 1. Additionally, some of the blocks of functionality 202–232 shown in the computer system may be implemented on a single substrate such as a system on a chip. More details are described below.

Figure 3:
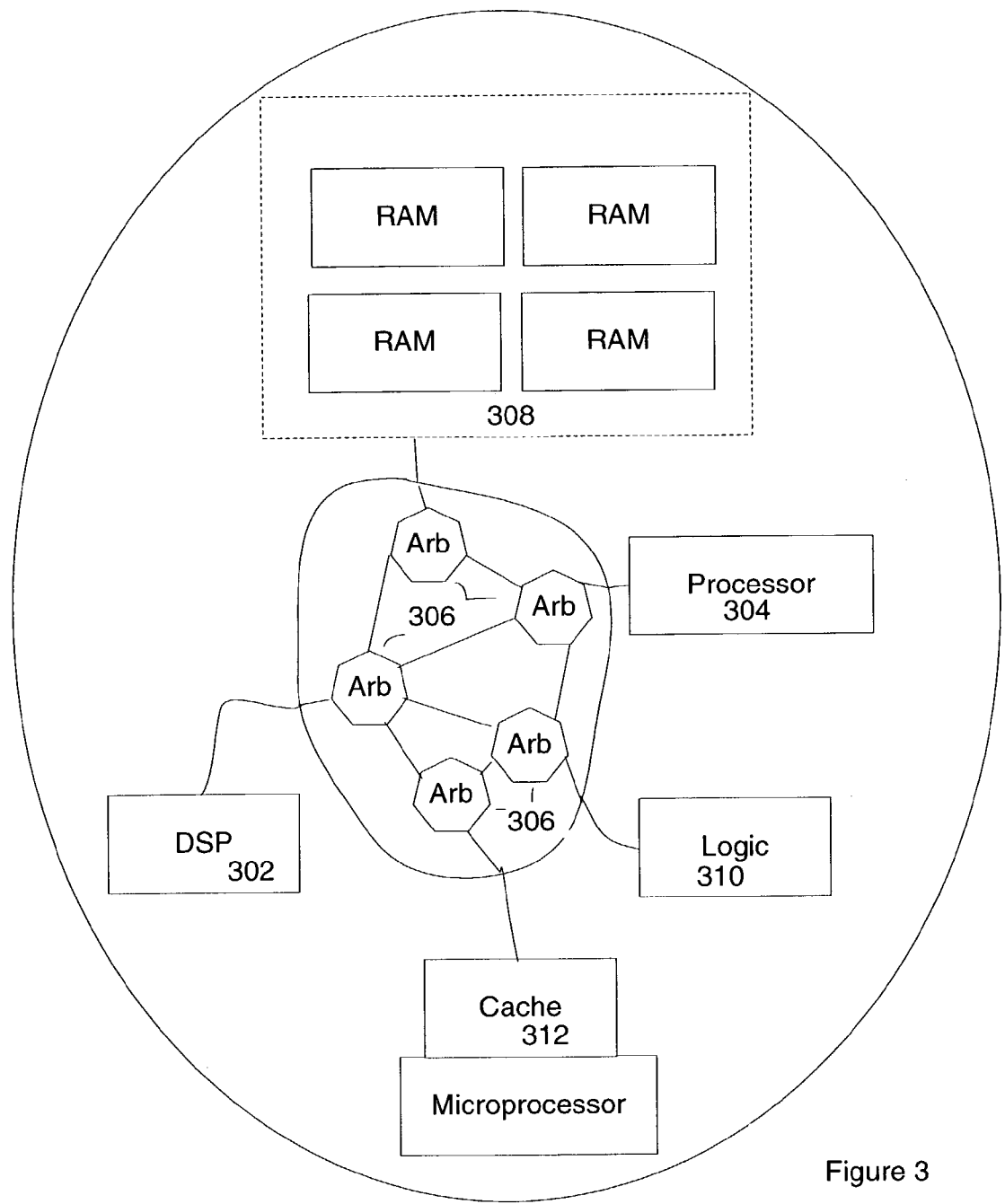
FIG. 3 illustrates a block diagram of an embodiment of an arbitration controller implementing the arbitration policy amongst multiple blocks of functionality.

FIG. 3 illustrates a block diagram of an embodiment of an arbitration controller implementing the arbitration policy amongst multiple blocks of functionality. Multiple arbitration units 306 may connect to various blocks of functionality 302–304, 308–312 to arbitrate requests for access to that shared resource 302–304, 308–312. The blocks of functionality 302–304, 308–312 may include Intellectual Property cores (IP) such as circuitry, buses, communication links, a microprocessor, etc., having self-contained designed functionality. Additionally, IP may be implemented in a variety of ways, and may be fabricated on a single integrated circuit such as a system on a chip. More details are described below.

Figure 4:
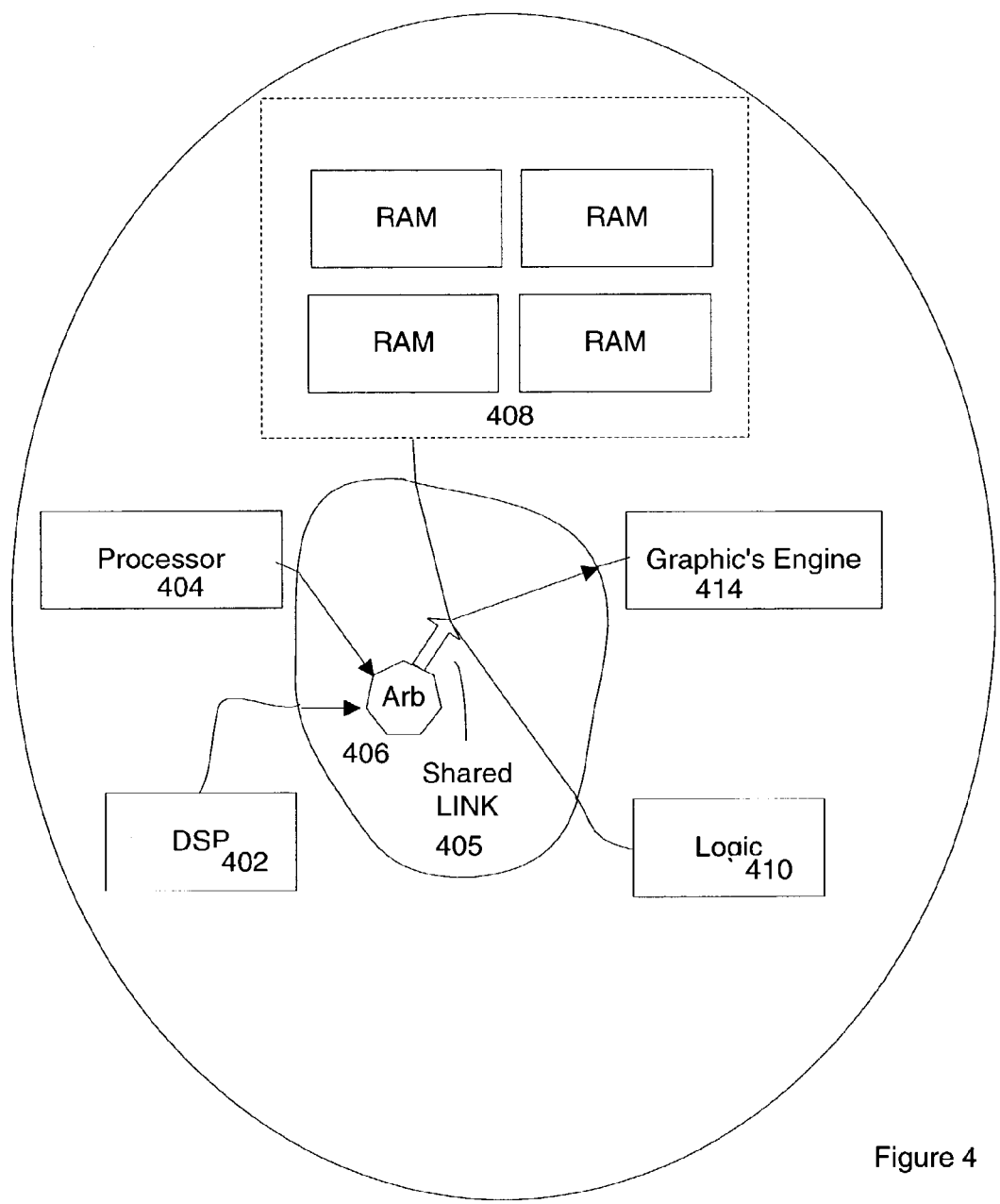
FIG. 4 illustrates a block diagram of an embodiment of an arbitration controller implementing the arbitration policy amongst multiple blocks of functionality having a shared link.

FIG. 4 illustrates a block diagram of an embodiment of an arbitration controller implementing the arbitration policy amongst multiple blocks of functionality having a shared link. More details are described below.

FIG. 5 illustrates a block diagram of an embodiment of an arbitration controller having a plurality of inputs that receive one or more transactions from a plurality of blocks of functionality. The plurality of blocks of functionality may supply their transactions via various branches, such as a first branch 502, a second branch 504, and a third branch 508. The transactions 510–514 from those blocks of functionality may have an epoch bit 516 attached to each one of those transactions such as, a first transaction 510, a second transaction 512, and a third transaction 514. The arbitration controller 518 may contain arbitration logic that includes various status registers 520. The status registers 520 may indicate on a per branch epoch basis, whether an epoch credit is due to a particular branch or not. A field configurable component 522 upstream of the arbitration controller 518 may attach an indication on the transactions 510–514 from the blocks of functionality. The field configurable component 522 upstream of the arbitration controller 518 may attach the indication by setting or resetting the Epoch bit.

The arbitration controller 518 has multiple inputs that receive one or more transactionsn 510–514, such as requests, replies, etc., from the multiple blocks of functionality, such as IP cores. The arbitration controller 518 arbitrates requests for access to a shared resource, such as a shared target block of functionality or a shared link, amongst the plurality of blocks of functionality by implementing an arbitration policy. The arbitration policy groups the transactions 510–514 from the plurality of blocks of functionality into global groups of transactions for servicing by that shared resource. The arbitration policy maintains that all of the transactions in a first global group are serviced by that shared resource prior to servicing transactions in a next global group of transactions.

The arbitration controller 518 may contain arbitration logic to facilitate the arbitration policy. The arbitration logic may include cascaded arbitration units that hierarchically arbitrate for the shared resource. At least one or more of the arbitration units arbitrates transactions from a subset of the functional blocks. Moreover, the topology of the functional blocks, such as the location of functional blocks and/or topology of the links, supplying the transactions to the inputs into the arbitration controller 518 is capable of varying independently of the arbitration policy achieved by the collection of arbitration units.

Thus, the arbitration logic implements an arbitration policy that maintains substantially similar global grouping of transaction arbitration results without having to alter any of the logic circuitry contained in the arbitration logic even if changes occur to the physical topology of functional blocks supplying the transactions to be arbitrated by the arbitration logic. The physical distribution of the arbitration points supplying the transactions 510–514 to the inputs into the arbitration controller 518 are capable of varying independently of whether a given transaction is included or not included into a global group of transactions to be serviced by the shared resource after an application of the arbitration policy contained in the arbitration logic.

The arbitration controller 518 arbitrates access from, in this example, three different incoming branches 502, 504, 508 to the one output 524. A local grouping of transactions may be submitted from each branch 502, 504, 508 in each cycle. If there is at least one transaction 510–514 submitted from a single branch 502, 504, 508, the transaction is sent to the output of the arbitration controller 524. If there are multiple branches 502, 504, 508 with transactions 510–514, an arbitration unit inside the arbitration controller 518 chooses which branch's transaction to forward to the output 524.

The arbitration policy proceeds in groups of transactions. A local group of transactions, such as an epoch, may be a group of transactions that are identified by a field configurable components 522 upstream of the arbitration controller 518. The basic principle is that the arbitration controller 518 forms a global grouping of transactions by allowing all transactions from one local group of transactions from each branch, before allowing any transactions from the next local group of transactions from any branch. In this manner, a fairness of access to a shared resource is maintained.

The field configurable component 522 upstream of the arbitration controller 518 may attach an indication on transactions from the blocks of functionality to control the start and end points of the local grouping of transactions. The attached indication controls how many individual transactions from a particular branch will be included in a given local group of transactions. In turn, this also may determine how many individual transactions from a particular branch will be included in a global grouping of transactions on the output of the arbitration controller 524. The field configurable component 522 upstream of the arbitration controller 518 annotates each transaction with a bit that specifies whether the corresponding transaction starts a new local group of transactions or not. This bit may be a start-of-epoch bit 516. The size, such as number of individual transactions, of each group of transactions from each block of functionality may be different, but the arbitration policy treats the epoch bit marked local group of transaction as a single transaction. Thus, the size of the local group of transactions and the resultant formed global group of transactions may be controlled upstream without the arbitration logic having to change anything.

The arbitration controller 518 by applying the arbitration policy allows transactions that are within the same local group of transactions from a particular block of functionality to proceed, while blocking transactions that start the next local group of transactions from that particular block of functionality.

When at least one of the branches 502, 504, 508 presents a transaction, and all of the branches supplying transactions 510–514 to the arbitration controller 518 are either 1) presenting a transaction with an epoch bit that starts a new epoch or 2) are not presenting a transaction, then the arbitration controller 518 completes the formation of the global group of transactions. The arbitration controller 518 rolls over the epoch after the formation of a global group of transactions. The arbitration controller 518 uses a register 520, such as an epoch credit bit per branch, to keep track of the epoch roll-over state for each branch. Once the arbitration controller 518 epoch is rolled over, transactions with an epoch bit that starts a new local group of transactions are accepted from all of the branches. The register 520 may also be a credit counter to track multiple roll-overs, that is incremented when the epoch rolls over and decremented when a request with epoch bit set wins arbitration.

When a transaction is processed through the arbitration logic, the arbitration controller 518 removes the epoch bit 516 from all of the transactions in the resultant global group of transactions in the output 524. The arbitration controller 516 attaches a new epoch bit to the first transaction sent to the output 524.

In addition, all epoch credit bits 520 are set for the branches 502, 504, 508 that do not win arbitration when the epoch rolls over. When an epoch credit bit 520 is set, it cancels the incoming start-of-epoch bit 516 on a branch, allowing a transaction on that branch to join the current global group of transactions. The epoch credit register 520 thus remembers that the arbitration controller rolled over for branches that did not have a transaction ready when the epoch rolled over, or that did not win arbitration at that time. Thus, the epoch credit register 520 tracks which branches 502, 504, 508 did not have a transaction in the global group but per the arbitration policy could have a transaction in the global group when the arbitration controller 518 rolled over and completed the formation of a global group of transaction. The epoch credit bit 520 for a branch is reset when it cancels an incoming start-of-epoch bit 516.

The epoch-based mechanism alone may not be sufficient to resolve all contention for the output, since it is possible for multiple transactions that are part of the same global group of transactions to be presented on different branches. All of these transactions 510–514 are eligible for transfer to the output 524 in the global group of transactions and their order must be resolved. For this reason, the arbitration controller 518 keeps track of the service order of the branches. When multiple branches have transactions ready that are to be part of the same global group of transactions, then the arbitration controller 518 allows the branch that was least-recently-serviced to pass through first. This second, age-based, part of the arbitration policy breaks the tie for transactions that are otherwise equal for arbitration.

FIG. 6 illustrates a block diagram of an embodiment of an arbitration controller receiving transactions of different sized local groups from the blocks of functionality. Each block of functionality is supplying, for example, four transactions. A field configurable component upstream of the arbitration controller supplies or attaches an epoch bit 616 only on every other individual transaction 612 coming from the block of functionality associated with the first branch 602. Therefore, the arbitration controller 618 includes twice as many transactions 612 from the first branch 602 into the global group of transactions formed by the arbitration controller 618 than compared to those transactions 610, 614 coming from the second branch 604 or the third branch 608.

In this example, several transactions 612, 614, 610, are queued for each branch 602, 604, 608 supplying an input into the arbitration controller 618. Each transaction 610, 612, 614 may be annotated with its own start-of-epoch bit 616. Each transaction 610, 614 in the second and third branches 604, 608 has the start-of-epoch bit 616 set. However, merely every second transaction 610 has the start-of-epoch bit 616 set in the first branch 602. The effect is that each local group of transactions 626, 628 from the first branch 602 consists of two individual transactions 612. The effect is that as long as all branches 602, 604, 608 are sending transactions 610, 612, 614, each global group of transactions will be made up of two transactions 612 from the first branch 602 and one transaction 610, 614 each from the second and third branches 604, 608.

The insertion of start-of-epoch bits 616 is controlled by the field configurable upstream sending unit, which thus determines the relative local group of transactions size. In this manner, a weighted fair arbitration may be achieved, where transactions from different branches are passed in the ratio of local group of transactions weights. If a given branch is not transactioning fast enough to fill up its share of every group of transactions, the remaining branches share the group of transactions with their own relative local group of transactions sizes. The relative weighting of the arbitration may be controlled from upstream and does not require any information to be known by the arbitration controller. In fact, the weighting can be changed dynamically without having to inform the arbitration controller, since the arbitration logic in the arbitration controller itself may be simply controlled by presence of the start-of-epoch bits.

Figure 7:
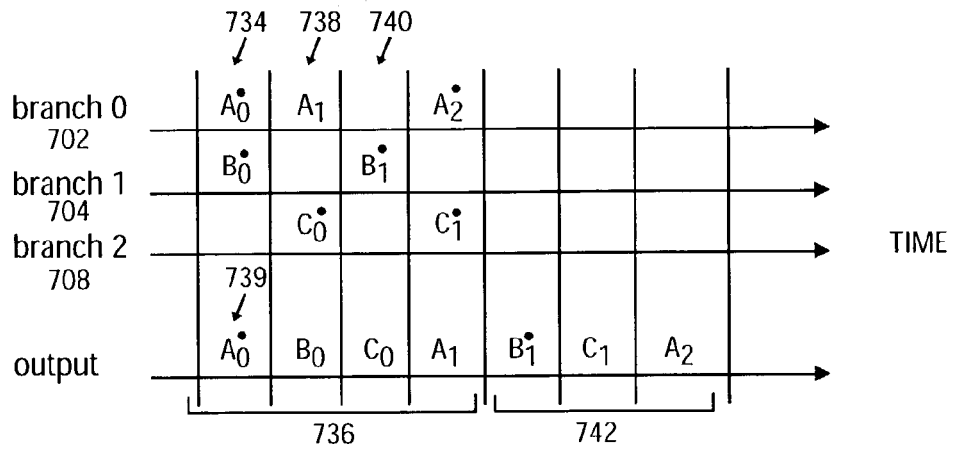
FIG. 7 illustrates an example sequence of transactions arriving from different branches, and the resulting global grouping of transactions when the arbitration policy is applied to the sequence of transactions.

FIG. 7 illustrates an example sequence of transactions arriving from different branches, and the resulting global grouping of transactions when the arbitration policy is applied to the sequence of transactions. The arbitration policy using the least-recently-serviced mechanism may be used to order transactions within each global group of transactions. Each transaction is shown as a numbered letter (A1, B2, etc) and is annotated with a dot to show whether it is carrying an epoch marker.

Transactions A0, A1 and A2 come from the first branch 702. Transactions from B0 and B1 come from the second branch 704, and transactions C0 and C1 come from the third branch 708. The arbitration controller senses on its inputs transactions A0 and B0 during the first timing cycle 734. Transaction A0 is included into the first global group 736 and is selected over B0 to be the first transaction in that first global group 736 to be serviced by the shared resource. The arbitration controller attaches the new epoch bit 739 on transaction A0 because transaction A0 is the first transaction in the global group of transactions to be serviced by the shared resource.

In the next time cycle 738, the arbitration controller, after the arbitration policy is applied, considers all of the transactions on its inputs that are to be part of this first global group 736. In this case, transactions A1, B0, and C0 are candidates. The least-recently-serviced order determines the ordering as B0, C0, and finally A1.

Thus, at the second time cycle 738, transaction B0 is placed into the first global group 736. Outgoing transaction B0 does not have an epoch marker, because it is part of the same global group of transactions 736. Next, transaction A1 and C0 are sensed at the input of the arbitration controller. Transactions from the A group or branch 0 have already been included into the first global group 736. Thus, the arbitration policy applies the least recently serviced factor, to place transaction C0 next in the order of transactions to be serviced from the shared resource on the output of the arbitration controller.

Transaction A1 does not have an epoch bit marker attached to that transaction to indicate the start of a new series of transactions. This means that transaction A1 and transaction A0 both came from the same local group of transactions. Thus, transaction A1 is also included into this first global group 736 of transactions to be serviced by the shared resource after the application of the arbitration policy on these transactions. Thus, transactions A0, B0, C0, and A1 are included in the first global group 736 of transactions to be serviced.

At this point, there are no requests available on the inputs of the controller that are still eligible to be part of the first global group of transactions 736. In accordance with the arbitration policy, the arbitration controller epoch rolls over.

Transactions B1, C1, and A2 all have epoch markers attached to those transactions from the field configurable component upstream of the arbitration controller to indicate that they each belong to new local groups of transactions. The arbitration policy directs that a new global group be formed under the condition when a new local group from each branch is sensed on the inputs of the arbitration controller. By application of arbitration policy including the least-recently-serviced factor, the transaction B1 will be the first transaction serviced in the second group of transactions 742. Tracing up the line of transactions serviced, transactions from the second branch 704 were the least-recently-serviced and thus B1 would be the first transaction serviced in this next group of transactions 742. At this point, the epoch credit bits for branch 0 and 2 are set, causing transactions C1 and A2 to follow B1 in the service order.

Each of these epoch credit bits is reset as the transactions with epoch marker set are allowed through the arbitration controller.

Figure 8:
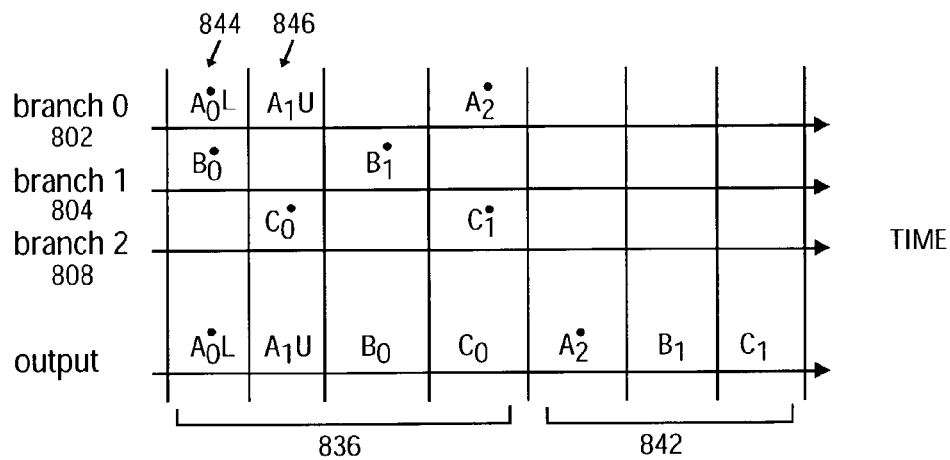
FIG. 8 illustrates an example sequence of transactions arriving from different branches, and the resulting global grouping of transactions when the arbitration policy having an arbitration locking factor is applied to the sequence of transactions.

FIG. 8 illustrates an example sequence of transactions arriving from different branches, and the resulting global grouping of transactions when the arbitration policy having an arbitration locking factor is applied to the sequence of transactions. In some cases, it is required that a set of transactions arriving from one branch stay together without being interleaved with transactions from other branches. Example reasons are for atomicity requirements or in order to perform mutual exclusion synchronization. Arbitration locking may be achieved with an additional bit of information that is carried with the transaction. In this case the annotation is whether to lock the arbitration (shown as L for lock) 844 or unlock (shown as U for unlock) 846. Locking should not cross global grouping boundaries.

FIG. 8 illustrates the same transactions from the first branch 802 which includes transaction A0, A1 and A2, from the second branch 804 transactions B0 and B1, and from the third branch 808 transactions C0 and C1, and the same first global group of transactions 836 is formed, however, the sequential order of how the shared resource sequentially processes and receives these transactions to service these transactions has been altered. The field configurable component upstream of the arbitration controller has attached a locking indication 844, 846 on transactions A0 and A1 to ensure that the shared resource services these indicated transactions sequentially. Thus, the order within the first group of transactions 836 to be serviced starts off with A0 and then is followed by A1, and then sequentially B0, and lastly C0.

As noted, the example transaction arrival order shown in FIG. 8 is the same used in FIG. 7, but this time, A0 and A1 are locked together. When the arbitration unit processes transaction A0, the arbitration logic is now locked onto that branch, so transaction A1 is guaranteed to be the next transaction to win arbitration. The result is that the output sequence in the first global grouping of transactions 836 has A0, A1 as the first two transactions, instead of A0, B0 as shown in FIG. 7. Thus, the field configurable component supports arbitration locking for atomicity.

Also, transaction A2 from the first branch 802 is the first transaction placed in the next global group of transactions 842 when the arbitration logic determines which branch has been least recently serviced during the formation of the second global group of transactions 842.

Figure 9A:
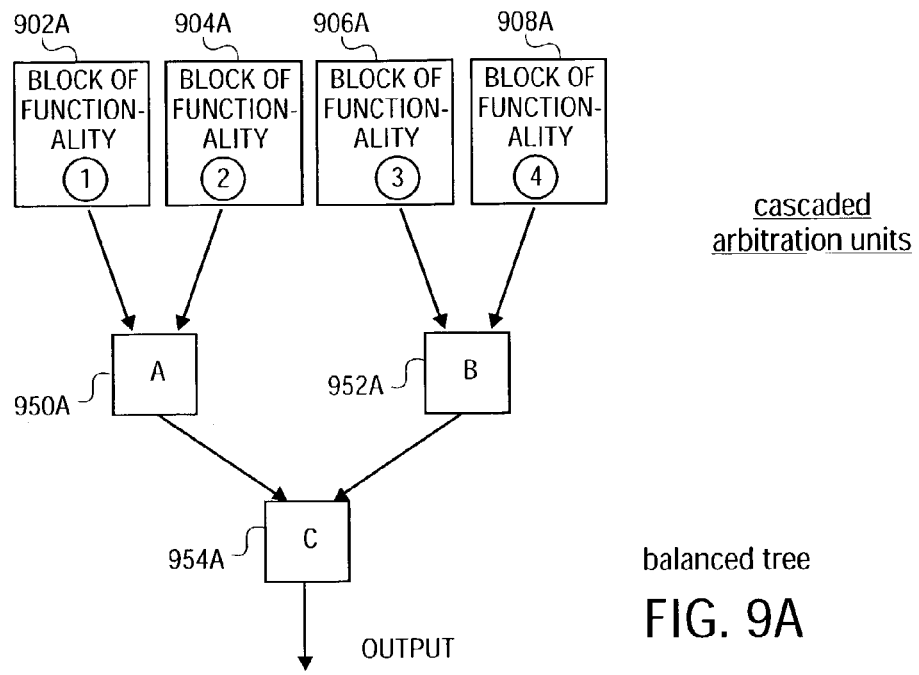
FIG. 9a and FIG. 9b, illustrate block diagrams of two different topologies of blocks of functionality supplying transactions to an arbitration controller in which both receive substantially the same statistical result on the output when forming the groups of transactions to be serviced by the shared resource.
Figure 9B:
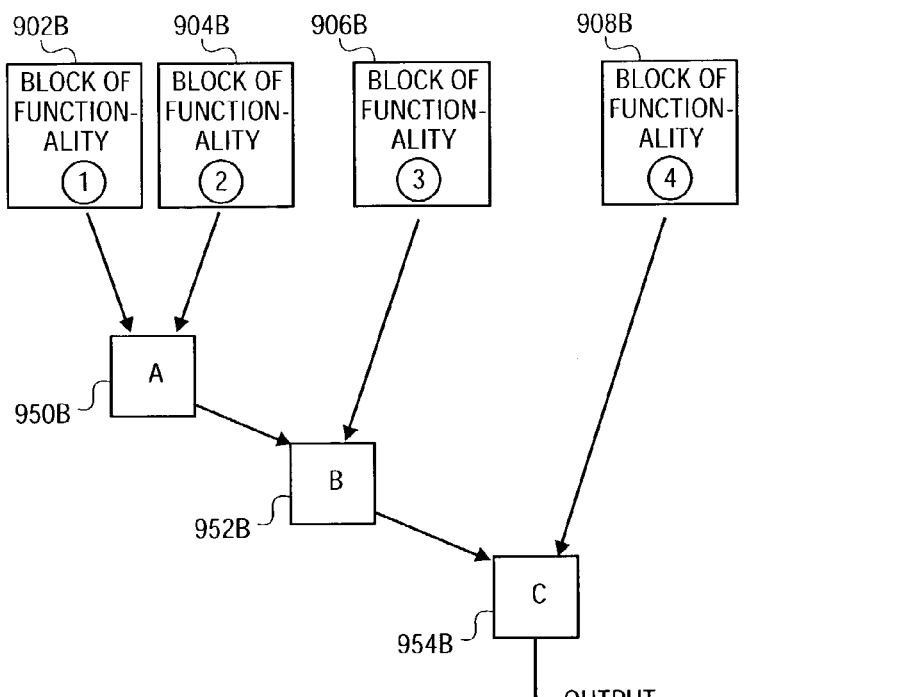

FIG. 9a and FIG. 9b, illustrate block diagrams of two different topologies of blocks of functionality supplying transactions to an arbitration controller in which both receive substantially the same statistical result on the output when forming the groups of transactions to be serviced by the shared resource. FIG. 9a shows a first, second and third arbitration units 950a–954a cascaded hierarchically. FIG. 9b also shows a first, second and third arbitration units 950b–954b hierarchically arranged in a cascaded manner. Each arbitration unit will hierarchically arbitrate for the shared resource and receive a subset of transactions from the functional blocks. However, as FIG. 9a and FIG. 9b show, the topology of the functional blocks 902a–908a, 902b–908b supplying the transactions to the inputs into the arbitration controller are capable of varying independently of arbitration policy achieved by the collection of arbitration units 950b–954b, 950a–954a. As shown in FIG. 9a, the arbitration units 950a–954a can be cascaded to form an arbitration controller tree that collectively performs arbitration between multiple incoming branches from the functional blocks 902a–908a. As shown in FIG. 9b, the arbitration units 950b–954b can be cascaded to form an arbitration controller tree that collectively perform arbitration between multiple incoming branches from the functional blocks 902b–908b. Each of the two trees shown has four input branches. But in FIG. 9a the arbitration controller tree is balanced, whereas in FIG. 9b it is very unbalanced.

The global groups of transactions formed by the two different trees 9a and 9b, will be identical in their composition. Merely, the order of transactions within the group may vary. Thus, the arbitration result achieved is substantially the same no matter what the physical topology the arbitration units 950b–954b, 950a–954a or block of functionality 902a–908a, 902b–908b is. For example, as shown in FIG. 9a, if an epoch bit is attached to every nth transaction from the blocks of functionality blocks 902a–908a, then each global group at the output of the third arbitration unit 954a contains n transactions from each branch. Similarly, as shown in FIG. 9b, if an epoch bit is attached to every transaction from the blocks of functionality blocks 902b–908b, then each global group at the output of the third arbitration unit 954b contains one transaction from each branch. A given transaction has approximately the same statistical percentage chance of being included in the first global group of transactions independent of the physical topology of the blocks of functionality supplying that transaction to an input of the arbitration controller.

The arbitration policy limiting one new epoch marked transaction per branch assures that the resulting global epoch formed by the collection of arbitration units each time includes at most one local grouping of transactions from each branch. The weighting of the number of individual transactions taken from each branch is thus independent of the physical arrangement of the cascaded arbitration units 950b–954b, 950a–954a.

Regarding FIG. 9b, in some embodiments, the transactions from the first and second block of functionality 902b, 904b are processed through the first, second and third arbitration units 950b–954b within a single clock cycle. The transactions from the third block of functionality 906b are processed through the second and third arbitration units 952b, 954b within that single clock cycle. Also, the transactions from the fourth block of functionality 908b are processed through third arbitration unit 954b within that single clock cycle. Thus, the first global group of transactions to be serviced by the shared resource coming from the arbitration controller will include one local group of transactions from each block of functionality. The sequential order of the transactions within this global group of transactions may be different than the order from FIG. 9a but the same transactions will be included in the global group of transactions formed on the output of the third arbitration unit 954b.

In some embodiments, the transactions from the first, second, and third blocks of functionality 902b, 904b, 906b may not be processed through the first, second and third arbitration units 950b–954b within a single clock cycle. For example, there can be register points between the arbitration units 950,–954b to pipeline the arbitration controller network However, the presence of the register points will not substantially affect the overall arbitration properties. The first formed global group of transactions may, for example, not include a complete local group of transactions from each block of functionality due to this time delay. The third arbitration unit 954b may implement the arbitration policy and determine that all of the branches supplying transactions to the arbitration controller are not going to be presenting a transaction this time period, and then the arbitration controller completes the formation of an initial global group of transactions. However, the Epoch credit bit will be set noting that the local group of transactions from this block of functionality could have been included in the first formed global group of transactions. The arbitration controller then may adjust for this with the formation of the second global group of transactions. This is important, because the topology of on-chip networks must often be related to the physical layout of different functional blocks communicating with one another. Statistically holding the arbitration properties of the network constant regardless of the physical distribution, connectivity, and pipelining of the arbitration controllers is beneficial.

Thus, at the startup of the system, the composition of the transactions from the different blocks of functionality in the initial global group of transactions from FIG. 9b may differ from the initial global group of transactions from FIG. 9a. However, the composition of transactions in the subsequent global group of transactions from FIG. 9b should match the subsequent global group of transactions from FIG. 9a. The arbitration logic applying the arbitration policy has not changed even though the topology and pipelining of the arbitration units accomplishing the arbitration has changed.

FIG. 4 illustrates an on-chip network using multi-threaded links. So far, each of the branches and output links discussed has been in the single-threaded link context, meaning they can carry a single logical connection over a particular physical link as shown in FIG. 3. Various blocks of functionality 402, 404, 408, 410, 414, may use a multi-threaded link to carry more than one logical connection over a single shared physical link 405. For example, the processor 404 may have a first logical thread connection going to the RAM 408, a second logical thread connection going to the graphics engine 414, and a third logical thread connection going to the logic 410 over the same shared link 405. The arbitration controller 406 ensures that each logical connection has its own independent flow-control.

Figure 10:
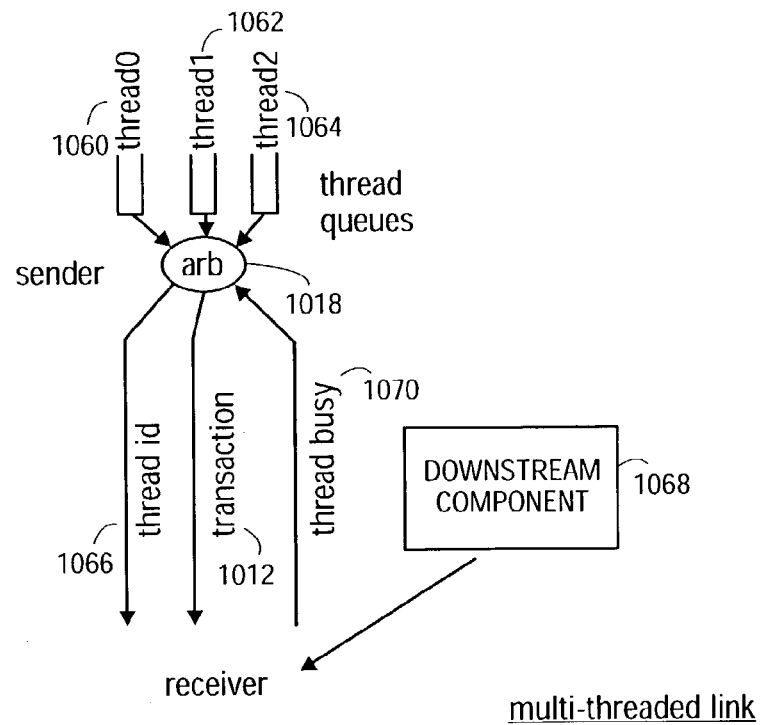
FIG. 10 illustrates a block diagram of a multi-threaded link with an embodiment of an arbitration controller receiving three different thread queues from the same block of functionality.

FIG. 10 illustrates a block diagram of an embodiment of a multi-threaded link with an arbitration controller receiving three different thread queues from the same block of functionality. The arbitration controller 1018 may receive many thread queues 1060–1064 when a shared link, for example, exists. Thus, multiple logical connections are made over one physical connection through the arbitration controller 1018 and through the shared link to target blocks of functionality. The arbitration controller 1018 may output a transaction 1012 and a thread ID 1066. The arbitration controller 1018 may receive from a component downstream of the arbitration controller 1068, such as a receiver, a communication to filter out of the arbitration logic transactions serviced by a particular shared target. The transactions would be filtered out of the arbitration process because that shared target is busy. Thus, a thread busy signal 1070 is sent by the component downstream of the arbitration controller 1068 to the arbitration controller 1018 for flow control in removing from the arbitration process a thread that can not be serviced.

Flow control is applied via a per-thread bit vector signal such as the threadbusy signal 1070. Setting the threadbusy bit corresponding to thread X on the link means that no further transactions can be accepted for thread X. The threadbusy information is used by the sending unit to arbitrate for access to the physical link amongst the logical connections that are ready to use the link. The field configurable downstream component 1068 may supply threadbusy signals as flow control mechanism for threads.

The arbitration controllers 1018 may contain arbitration logic that includes branch arbitration logic and thread arbitration logic. The arbitration logic filters out the unserviceable thread from the arbitration process. The arbitration policy weights the transactions from the blocks of functionality based on a multi-threaded link factor through the thread arbitration logic. The arbitration logic applies the arbitration policy to determine a winning thread from each branch. Once a winning thread to be included next in the global grouping has been decided, that transaction is passed over the shared link with an indication of the thread that it belongs to via the thread ID signal 1066.

Figure 11:
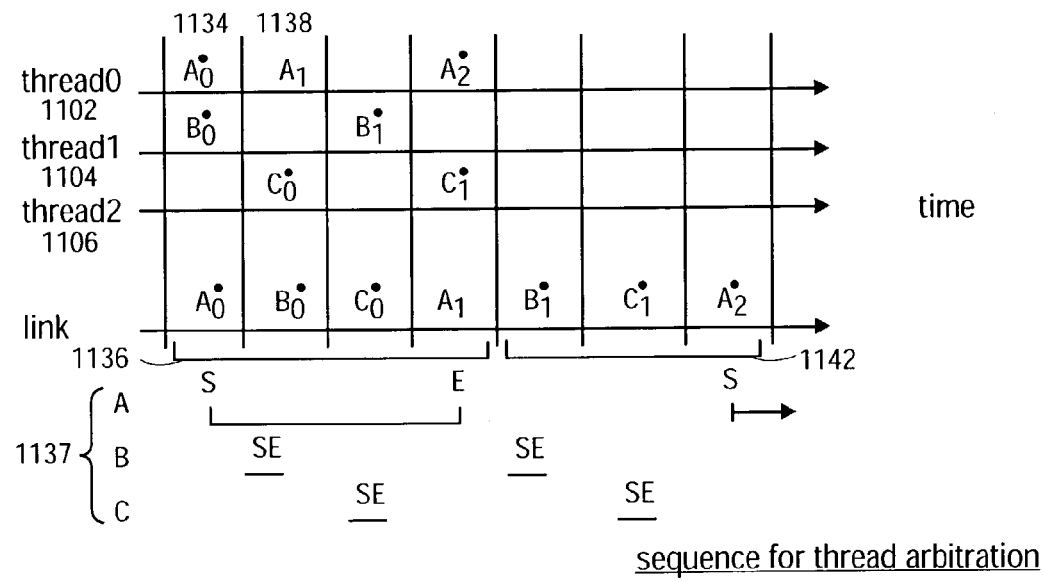
FIG. 11 illustrates an example sequence of transactions from the various threads rather than from the various branches, and the resulting global grouping of transactions when the arbitration policy is applied to the sequence of transactions.

FIG. 11 illustrates an example sequence of transactions from the various threads rather than from the various branches, and the resulting global grouping of transactions when the arbitration policy is applied to the sequence of transactions. The transactions A0, A1, and A2 come in thread-0 1102 from a block of functionality, thread-1 1104 may come from that same block of functionality and sends out transactions B0 and B1, and transactions C0 and C1 come from thread-2 1106 from the same block of functionality. FIG. 11 shows an example sequence of transactions for thread arbitration in a sender such as that shown in FIG. 10. The arrival sequence of transactions on each thread is identical to the arrival sequence of transactions on branches in the example shown in FIG. 7. Note, thread-0 1102 through thread-1 1106 need not all come from the same block of functionality.

At the first time period 1134 after the arbitration policy is applied to the transactions, transactions A0 and B0 are put into the first global group of transactions 1136 to be serviced by that shared link. The next time period 1138 of the arbitration policy determines whether to put in transaction A1 or C0 into the global group 1136 and because transactions from thread-2 1106 have been the least recently served, transaction C0 is placed into the group followed by then transaction A1. Transactions A0, B0, C0 and A1 form the first global group of transactions 1136 to be serviced across that shared link. Note, merely transactions A0 and A1 will be actually be serviced by the first target resource, transaction B0 will be serviced by a second target resource and transaction C0 will be serviced by a third target resource. However, all three target resources used the same shared link. Also, in some embodiments, a number of different threads may be serviced by a single multi-threaded target resource.

The groupings of transactions shown at the bottom of the figure reflect the global arbitration groupings 1136 as well as the groupings per thread 1137 formed within that global arbitration group.

In the second group of transactions 1142 formed on the output of the arbitration controller are transactions B1, C1, and A2. Each one of these transactions has an epoch bit marker attached to that transaction. The arbitration logic recognizes that all three threads have a new set of transactions pending and thus forms a second global group of transactions 1142 to be serviced across the shared link.

The arbitration mechanism for thread arbitration may be very similar to that used for branch arbitration as shown in FIG. 5. A difference between thread arbitration logic and branch arbitration logic is that while branch arbitration forms new epochs, and therefore an epoch marker is placed on an outgoing transaction when the arbitration controller epoch has rolled over, thread arbitration substantially always maintains the epoch markers from each thread.

A result of thread arbitration is that transactions on different threads are interleaved in the ratio of the local group of transaction sizes provided by the upstream sending units. In the example of FIG. 11, thread-0 1102 has a local transaction group size of two, A0 and A1, while threads 1 and 2 have a local transaction group size of one. When all threads have transactions ready to send, and in the absence of any flow control from downstream, two transactions from thread-0 1102 will be passed for one transaction each from threads-1 and 2, 1104, 1106.

Figure 12:
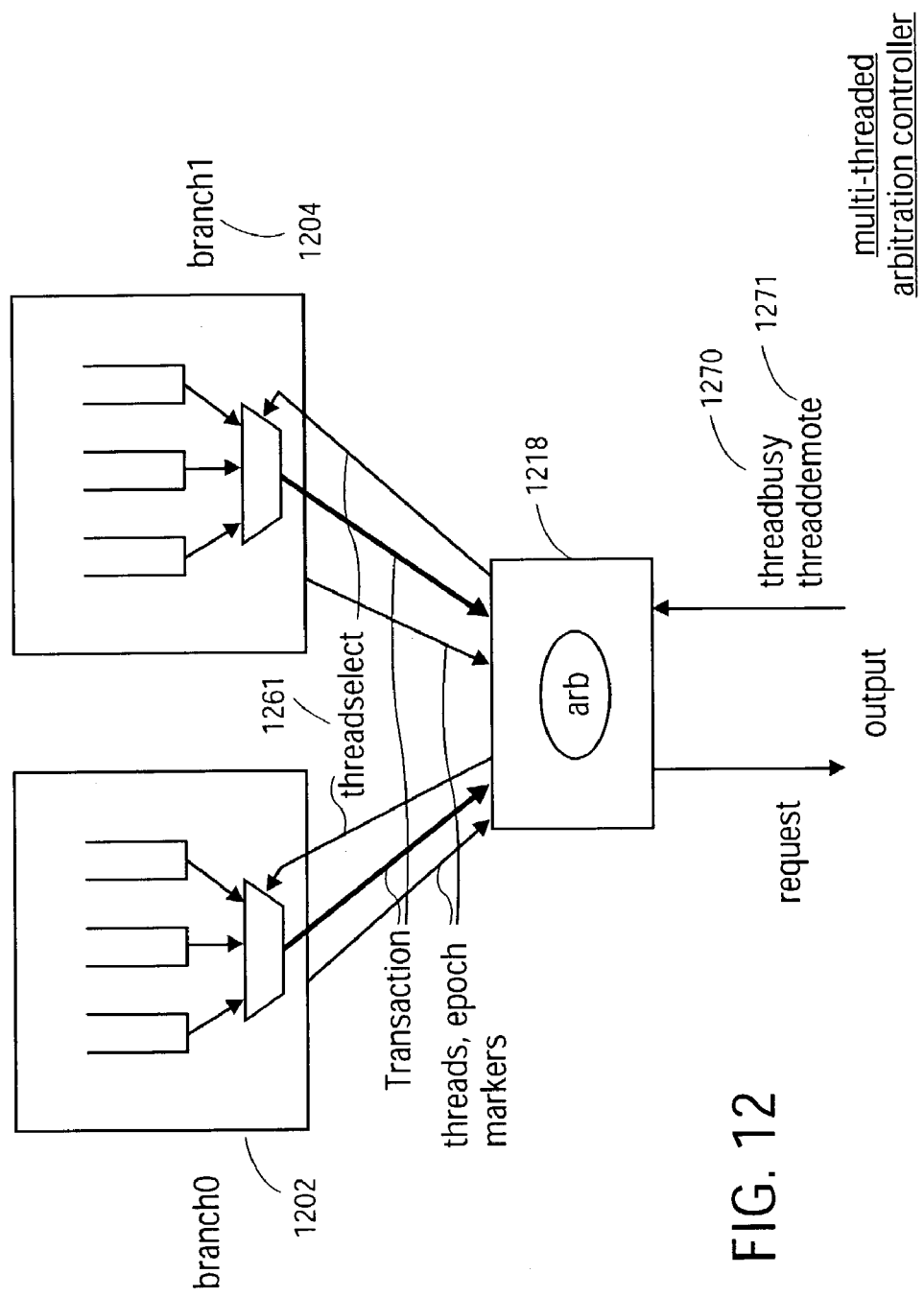
FIG. 12 illustrates a block diagram of an embodiment of an arbitration controller receiving on it's input, multi-threaded transactions from a first block of functionality via branch 0, and a second block of functionality via branch 1.

FIG. 12 illustrates a block diagram of an embodiment of an arbitration controller receiving on it's input, multi-threaded transactions from a first block of functionality via the first branch, and a second block of functionality via a second branch. The arbitration logic in the arbitration controller 1218 may contain thread arbitration logic as well as branch arbitration logic.

Each of the two branches 1202, 1204 supplying transactions into the arbitration controller 1218 may have, for example, three threads. The branches 1202, 1204 pass down a bit-vector of threads that have a request ready and the corresponding epoch markers to the arbitration controller 1218. One or more arbitration units within the arbitration controller 1218 take in this information, and perform both thread and branch arbitration to decide which thread from which branch 1202, 1204 is allowed to send a transaction. The decision may be sent to the branches via a threadselect vector 1261. Whenever there is at least one transaction ready, one branch has a single bit set in its threadselect vector, allowing it to send a transaction from the corresponding thread, whereas the other branch receives a threadselect vector with no bit set, so it does not send any transaction. The arbitration controller 1218 also takes into account downstream flow control in the form of the threadbusy signal 1270, and a thread priority control signal such as a threaddemote signal 1271. A component downstream of the arbitration controller may communicate to the arbitration logic in the arbitration controller 1218 to dynamically demote a priority assigned to an incoming transaction. The downstream component may supply threaddemote signals 1271 for each of the threads.

Figure 13:
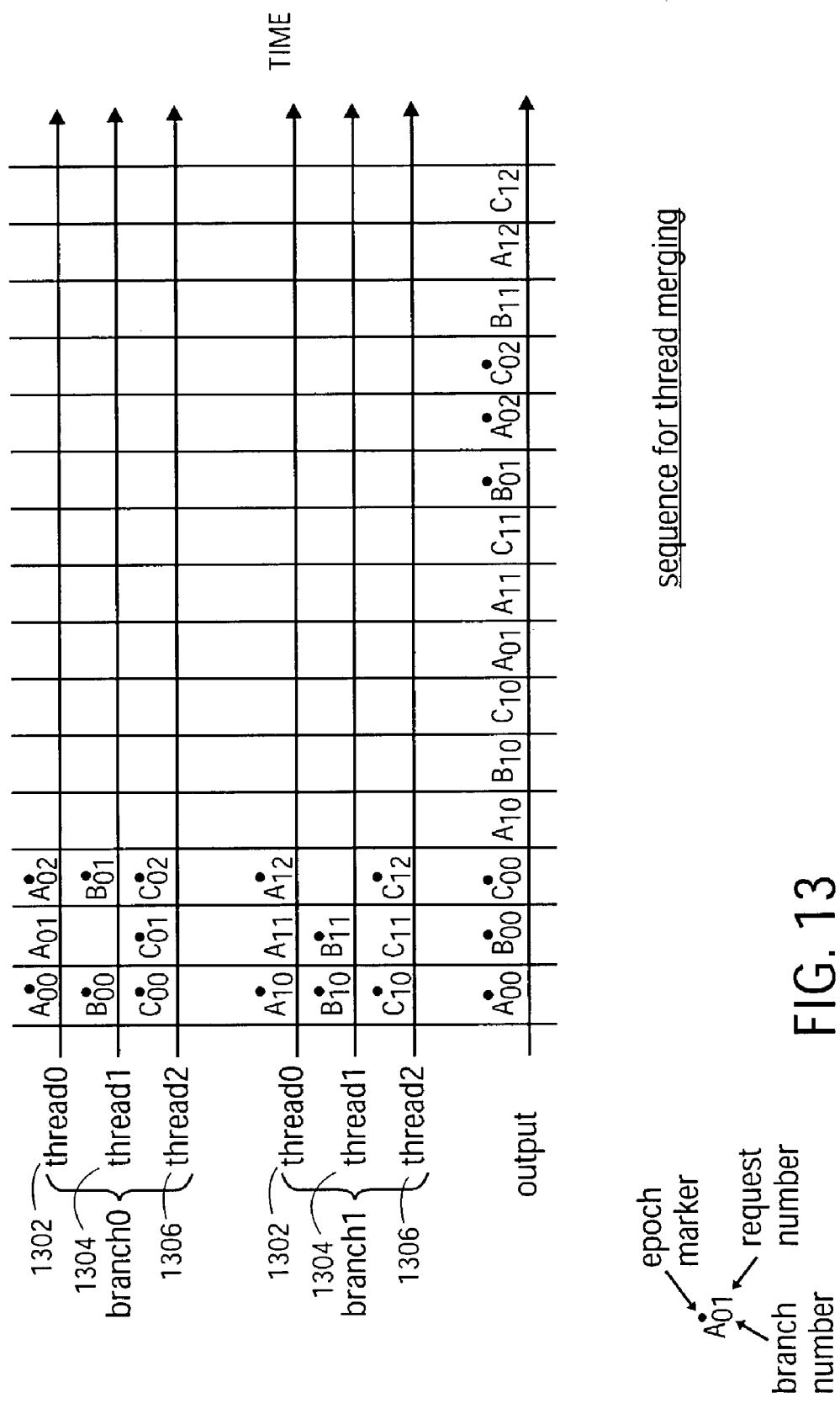
FIG. 13 illustrates an example sequence of various transactions from threads within the various blocks of functionality, and the resulting global grouping of transactions when the arbitration policy is applied to the sequence of transactions.

FIG. 13 illustrates an example sequence of various transactions from threads within the various blocks of functionality, and the resulting global grouping of transactions when the arbitration policy is applied to the sequence of transactions. The first block of functionality via branch 0 may supply three different threads, thread 0 through thread 2 of transactions to the inputs of arbitration controller. In the first thread 1302, thread 0, may contain transactions A0, A1, and A2. The second thread 1304, thread 1, may contain transactions B0 and B1. The third thread 1306 may contain transactions C0, C1, and C2. The second block of functionality may also supply various threads with various transactions via branch 1. The first thread 1302 may also contain transactions A10, A11, and A12 received back from branch 0. The second thread 1304 may also contain transactions B10 and B11 received back from branch 1. The third thread 1306 also may contain transactions C10, C11, and C12 received back from branch 1. The resultant output group from the arbitration controller in the global group of transactions may contain transactions A0, B0, C0, A10, B10, C10, A01, A11, and C11. After transaction C11, on the next time cycle, on all the inputs from all the threads in the various blocks functionality, all indicate a new epoch marker, which causes the arbitration logic to start the formation of the second global group of transactions to be serviced from the shared resource.

The arbitration controller processes the example transactions with a combination of branch and thread arbitration. Similar to FIG. 11, transactions are serviced within the global group of transactions, in thread order, and branch order within each thread. There may be a branch group of transactions for each thread 1302–1306 and a thread group of transactions for all threads. As shown in FIG. 11, when the thread epoch rolls over, the first transaction from each thread carries the epoch marker. Subsequent transactions are passed until all threads 1302–1306 on all branches are ready to start a new global group of transactions. When the epoch rolls over branch and thread credit bits are maintained in a manner similar to what was described for the basic arbitration controller of FIG. 5.

Figure 14:
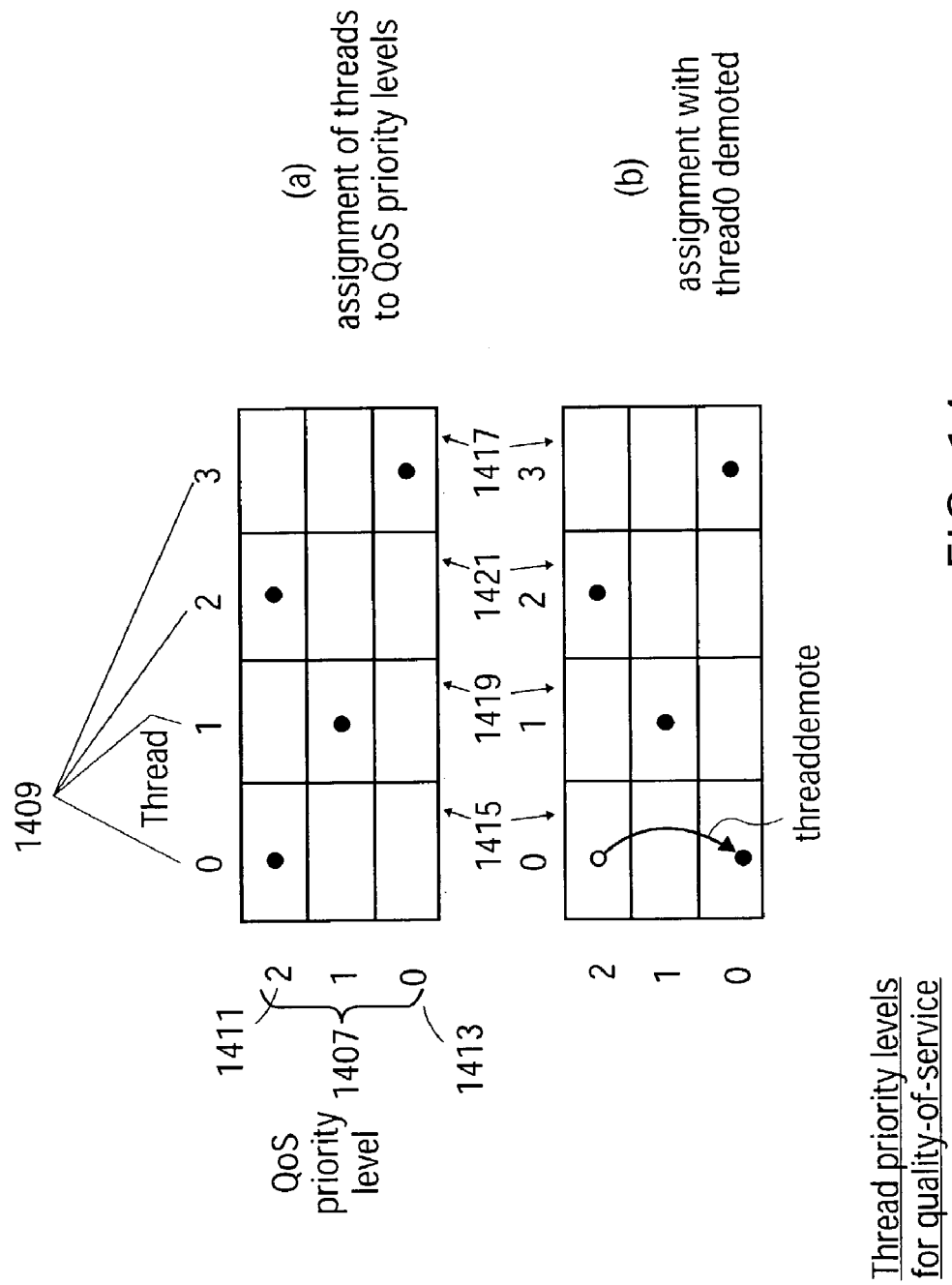
FIG. 14 illustrates a table in an embodiment of the arbitration policy showing a quality of service priority level.

FIG. 14 illustrates a table in an embodiment of the arbitration policy showing a quality of service priority level, ranging from 0 through 2, and threads ranging from 0 through 3, showing the association of each thread with a quality-of-service priority level. The arbitration policy may weight the transactions from the blocks of functionality based on a Quality of Service factor.

FIG. 14*a* illustrates that different quality-of-service (QoS) priority levels may exist for different threads. Each of the four threads 1409 has been assigned to one of three QoS priority levels 1407. Level-2 1411 has the highest priority and level-0 1413 the lowest.

Quality-of-service (QoS) may be used here to describe the latency and bandwidth properties that a given sender block of functionality experiences when arbitrating for a shared resource. Higher QoS priority levels correspond to lower latency and lower-jitter bandwidth service.

Transactions that are from threads 1409 at a higher QoS priority level 1407 always win over transactions from threads 1409 at a lower QoS priority level 1407. Within a given QoS priority level 1407, epoch-based arbitration decides the relative weighting of transactions. A component downstream of the arbitration controller may also dynamically control the QoS priority level from downstream using the threaddemote bit vector. For example, the threaddemote bit for thread-0 1415 has been set, causing thread-0 1415 to be demoted to the lowest QoS priority level. It may be now considered on par with thread-3 1417, and below thread-2 1421 and thread-1 1419. This dynamic thread demotion may be useful for varying the quality of service provided to a thread dynamically, depending on system conditions such as the amount of bandwidth a thread has been using versus how much bandwidth it had been allocated.

In summary, transactions are first ordered by the current thread QoS level of priority. Within a QoS level, they are serviced using the group of transactions-based scheme, and within each group of transactions, transactions are ordered using the least-recently-serviced mechanism. All along the arbitration controller implements the arbitration policy to consider thread flow control (via threadbusy), dynamic adjustment of the QoS priority level (via threaddemote), and atomicity/locking (via lock bit). However, not all arbitration controllers need to have all of these functions. Arbitration controller may use a subset of these functions. Removing the corresponding mechanism can derive arbitration controllers with only a subset of functionality.

Figure 15:
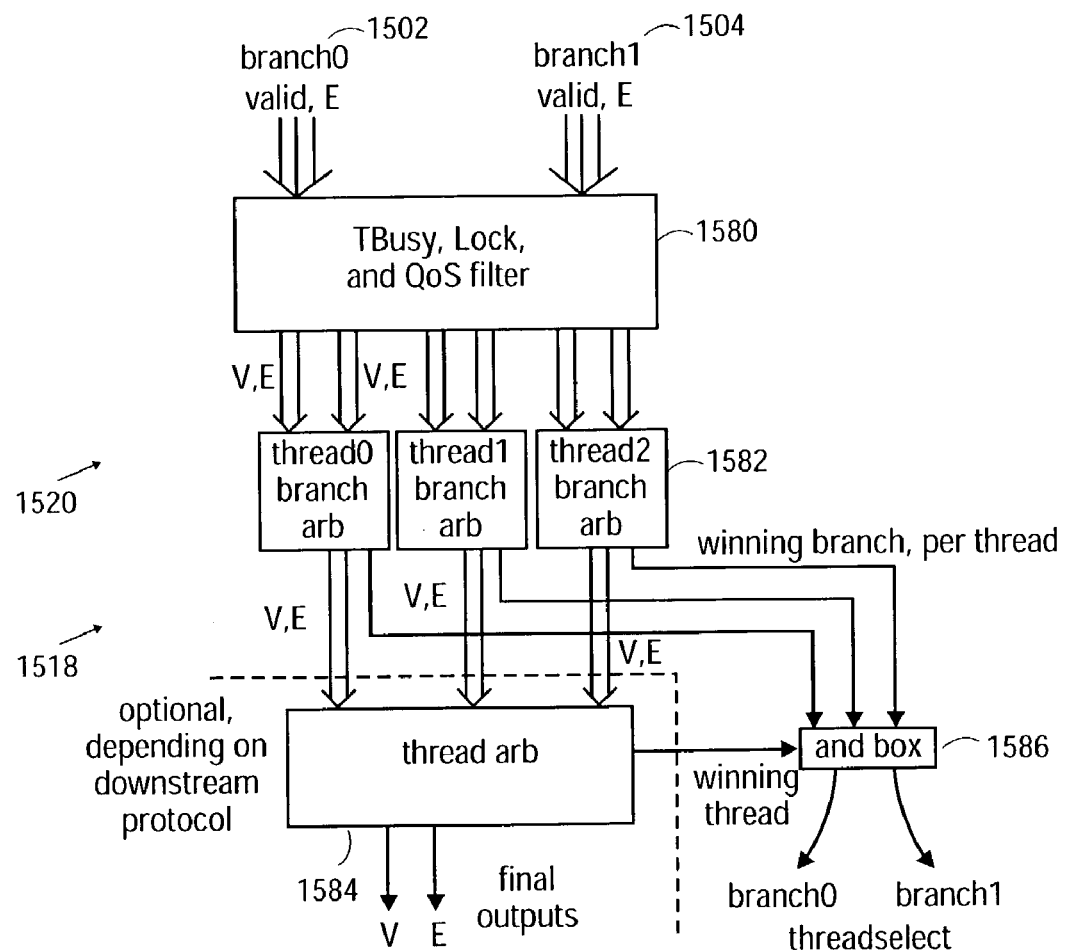
FIG. 15 illustrates a block diagram of an embodiment of the arbitration controller with the arbitration logic.

FIG. 15 illustrates a block diagram of an embodiment of the arbitration controller with the arbitration logic. An embodiment of the arbitration controller 1518 with the arbitration logic 1520 may have a thread busy, lock, and quality of service filter 1580, multiple branch arbitration logic blocks 1582, a thread arbitration logic block 1584, and an AND box 1586.

Transactions supplied from the blocks of functionality may enter via the first branch 1502 or the second branch 1504. The incoming valid bits and epoch markers from each branch are filtered in the threadbusy, lock, and QoS filter 1580. QoS, threaddemote, thread busy, and locking are all processed within the top filter block of logic 1580. The thread busy, which receives its communication from a component downstream of the arbitration controller, may filter out transactions headed toward a shared resource, which is currently busy at the time. Locking is based on indications attached to transactions and is enforced in the filter logic 1580.

The threadbusy, lock, and QoS filter 1580 filters out transactions that have thread flow control applied (threadbusy), that are not from a branch that is currently locked onto a thread, or that are from a lower QoS priority level when transactions from a higher level are present. The resulting filtered information is passed to the branch arbitration units 1582.

The transactions from the various branches are processed through the branch arbitration logic 1582. There is one branch arbitration unit 1582 per thread. It processes all transactions from that thread and passes the resulting valid and epoch marker to the thread arbitration unit 1584. The branch arbitration logic 1582 determines which branch should win the arbitration based upon the least recently serviced and transaction grouping mechanism, and sends an input over to the AND box 1586 per branch.

The threads from the blocks of functionality are processed through the thread arbitration logic 1584. The thread arbitration logic unit 1584 determines the overall winning thread from all branches. The winning thread is sent over to an AND box 1586. The AND box 1586 combines the winning thread information with the winning branch per thread information to give an overall winner. Thus, the AND box 1586 determines which thread from which branch wins that particular arbitration and is put into the global group first. As the arbitration process of the transaction continues, the least recently serviced factor, the quality of service, and the locking factors are all looked at. Eventually the first global group of transactions to be serviced by shared resource is formed.

Thus, the thread arbitration unit determines the winning thread while in parallel, each branch arbitration unit figures out the winning branch if its thread were the winner. The final winner is chosen by ANDing the thread arbitration winner with the branch arbitration winner in the AND-box to generate a per-branch threadselect vector.

Note, this is a possible implementation and many more are possible.

Figure 16:
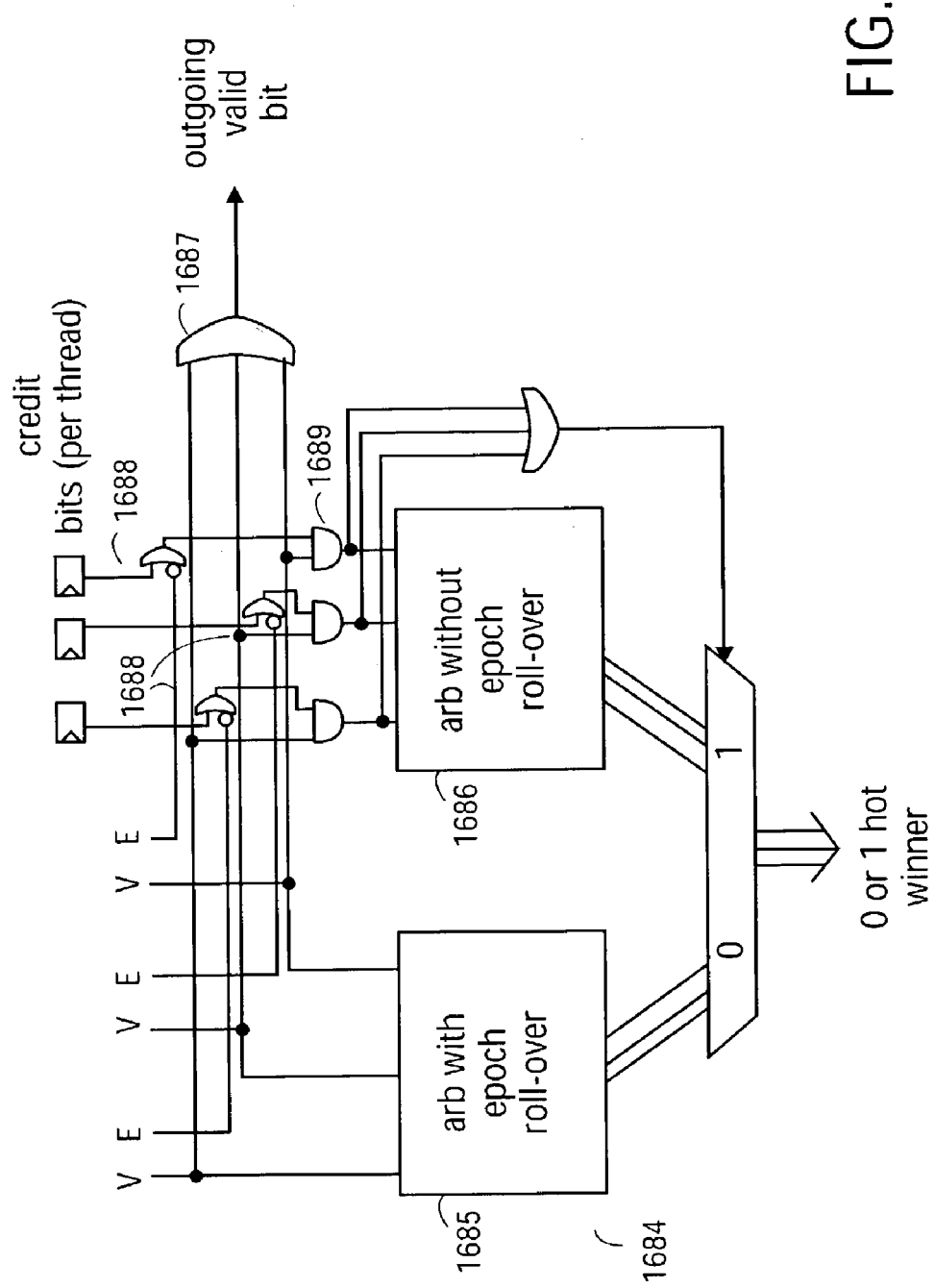
FIG. 16 illustrates a block diagram of an embodiment of thread arbitration logic.

FIG. 16 illustrates a block diagram of an embodiment of the thread arbitration logic. The thread arbitration logic 1684 may have a first block of arbitration with epoch roll-over 1685 and a second block of arbitration without epoch roll-over 1686. One is used to determine the winner without epoch roll-over, and the other with epoch roll-over. If there is no winner without epoch roll-over, the result from epoch roll-over is used. A basic arb block takes care of determining which of a number of thread requests should be the winner, given the history of service order of threads. An example implementation of a possible basic arb block is described in-figures 18*a* and 18*b*.

Referring to FIG. 16, each thread may provide two inputs into this logic. The valid input, meaning that a transaction is present, and the epoch input, indicating whether a start of an epoch bit has been attached to the transaction or not. The valid input connects directly to the arbitration with epoch roll-over logic 1685 and also an outgoing valid bit OR gate 1687. Each of the threads goes into a Not-Or gate 1688 and then into an AND gate 1689 to be processed into the arbitration without roll-over logic 1686.

A logical one comes out of one of the AND gates 1689 1) if the valid bit is set, and 2) either a) the epoch bit is not present or b) if the credit bit is set. If so, this request will be included in this current global grouping of transactions. The first transaction placed into the current global group of transactions to be serviced by the shared resource will bear a new epoch marker. The outgoing epoch marker may be simply the epoch marker of the winning thread. Also, all of the other transactions in this group will have their epoch markers removed and therefore this entire group will be serviced or thought of by the another arbitration unit downstream as a single start and end point for this current global grouping of transactions to be serviced by the shared resource. In a multithreaded transaction the epoch markers are left on. As discussed above, both logic blocks 1685, 1686 provide an input to determine a winner to be placed into the first group of transactions to be processed by the shared resource.

Figure 17:
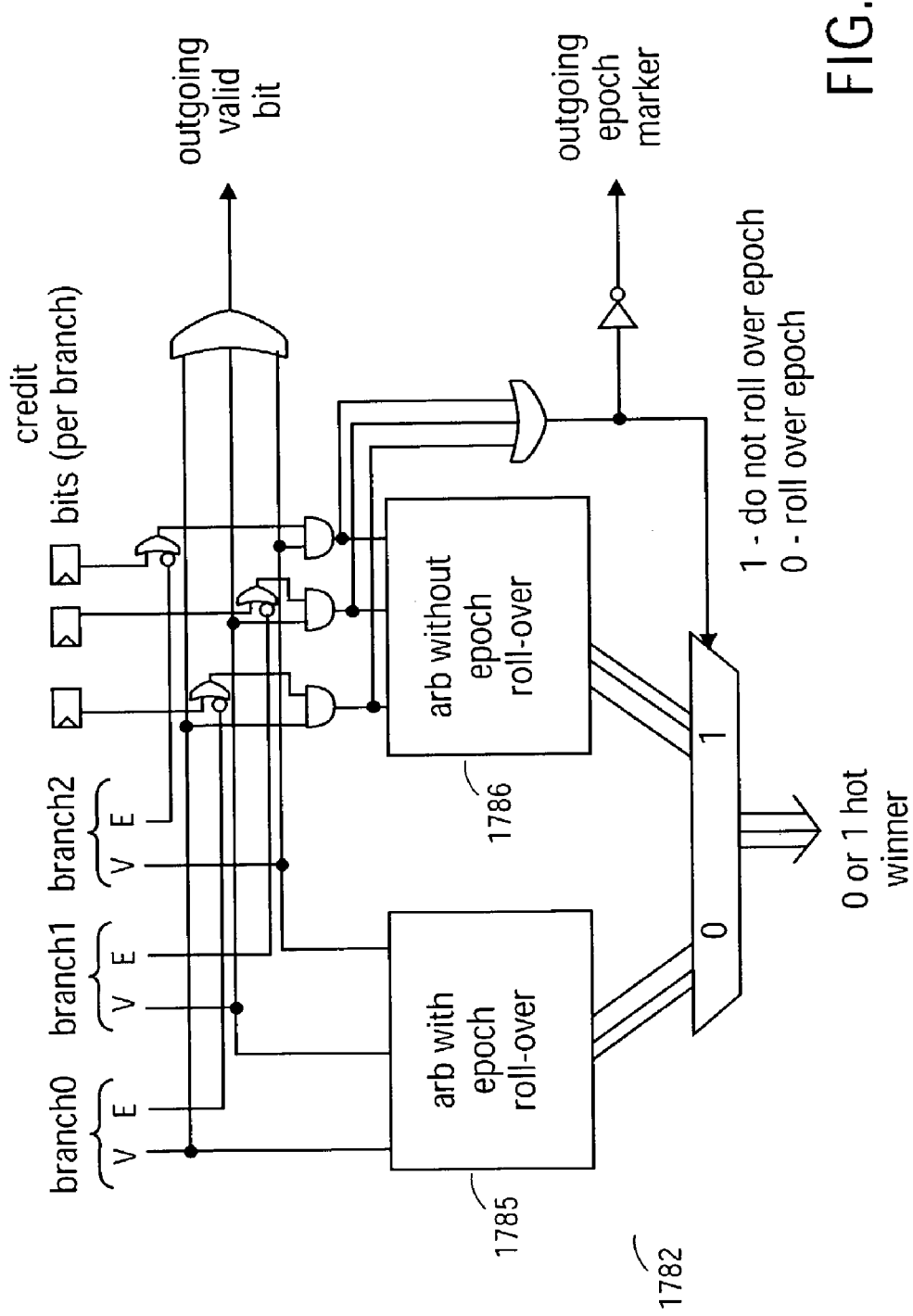
FIG. 17 illustrates a block diagram of an embodiment of branch arbitration logic.

FIG. 17 illustrates a block diagram of an embodiment of branch arbitration logic. The branch arbitration logic 1782 may have two blocks of arbitration one with epoch roll-over 1785 and the other arbitration without epoch roll-over 1786. For an embodiment, the branch arbitration unit may be very similar to the thread arbitration unit, except that outgoing epoch marker is generated differently: it is set when the epoch rolls over. Thus, the arbitration policy can be applied to thread arbitration in a very similar manner as it is applied to branch arbitration. Therefore, the arbitration policy takes into consideration a multi-branch arbitration factor, a multi-thread link factor, a least recently serviced factor, a quality of service factor, a locking factor, as well as other factors when forming a global group of transactions to be serviced by a shared resource.

Figures 18A, 18B:
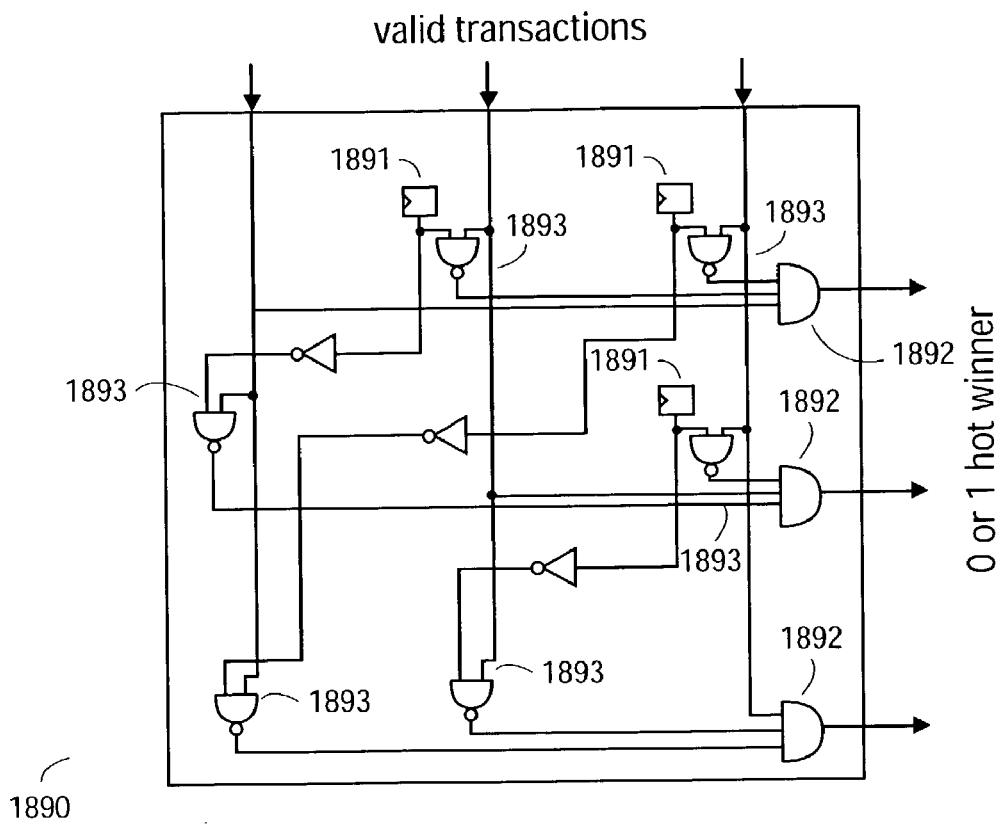
FIG. 18a illustrates a block diagram of an embodiment of basic arbitration logic.
FIG. 18b illustrates a table of an embodiment of a row and column pair history of service comparing a first branch to the other branches stored in a status register.

FIG. 18a illustrates a block diagram of an embodiment of basic arbitration logic. The basic arbitration logic 1890 may include status registers 1891 to store a row and column pair history of service comparing a first branch to the other branches. The basic arbitration logic 1890 may further include one or more common logic gates 1892, such as the three input AND gates, to receive a signal from all of the branches indicating whether that branch should win the arbitration process. The arbitration logic may further include inhibit logic gates 1893, such as the NAND gates, to receive an input from the status register 1891 and to provide an inhibit signal to the common logic gate 1892 indicating whether that branch should win the arbitration process.

The basic arbitration logic 1890 contains various status bits in the status registers 1891. Each one of the status bits holds the state, which indicates the relative age between the requesting branches to aid in determining the least recently serviced transaction. Each one of the status registers 1891 is connected via an inverter to one input of a NAND gate 1893. The other input of the NAND gate 1893 gets an input whether a valid transaction is present. Between that the winner is determined.

FIG. 18a shows an example with 3 requesters, but the same scheme is possible with requestors from 2 on up. The timing of this implementation scales very nicely as the number of requestors increases, because the complexity of the algorithm does not change. It simply requires more fan-out of the transaction signals and more fan-in for the final AND gate.

FIG. 18b illustrates a table of an embodiment of a row and column pair history of service comparing a first branch to the other branches stored in a status register. In this example, four branches, such as Br3–Br0, supply transactions to the arbitration logic. Br3 is the oldest transaction or in other words the branch having the least recently serviced transaction. Br0 is the youngest transaction or in other words the branch having the most recently serviced transaction.

The basic arbitration logic 1890 keeps track of the relative service order between requestors and sends out a 1-hot vector of the winning requestor, given the service order. The service order state is arranged in rows and columns, one per requester transaction. A bit of state in each row/column intersection (table cell) remembers whether the row requestor has been service more recently than the column requestor. The lower left triangle of this table 1894 is the inverse of the upper right 1895, and these state bits are simply derived using an inverted version of the corresponding state bit from the upper right triangle 1895. The diagonal 1896 is empty. A bit vector of requestors is fed in vertically. At each table cell, the service order bit suppresses requestors that have been serviced more recently than another active requestor. When all of the table cell results in one row are ANDed together, there is exactly one that has not been suppressed in any table cell and this is the requestor that has been serviced least recently. Once a winner has been established, the table cell state bits for the corresponding column and row are updated to mark the corresponding requestor as most-recently-serviced.

On multi-threaded arbiters with threadbusy flow-control, a mechanism that keeps track of the age of individual requests should be employed to break the tie between requests that are equally eligible. Since threadbusy flow control can be applied at any time, an arbitration mechanism such as round-robin arbitration can end up with a repeated pattern of a particular thread substantially always having threadbusy applied when it is the highest priority transaction, leading to a lack of forward progress for that transaction. The least-recently-serviced arbitration mechanism should not suffer from this problem, because the least-recently-serviced requestor remains the highest priority transaction until it actually gets serviced.

Figure 19:
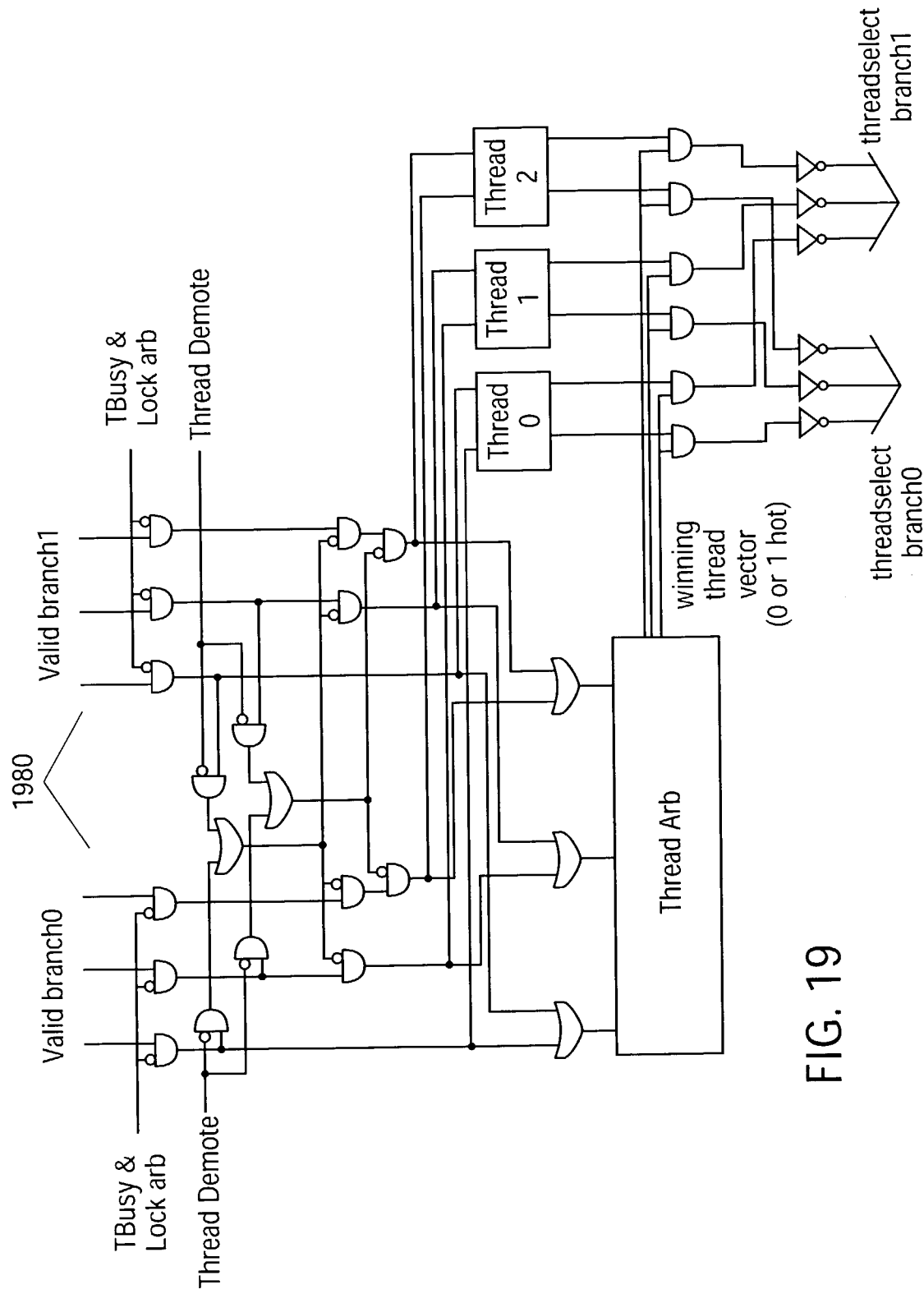
FIG. 19 illustrates a block diagram of an embodiment of an arbitration controller having multi-thread, lock, priority, and quality-of-service features.

FIG. 19 illustrates a block diagram of an embodiment of an arbitration controller having multi-thread, lock, priority, and quality-of-service features. The upper part of FIG. 19 shows a possible implementation of the threadbusy, lock, and QoS filter gates 1980 in more detail. A lock on another branch of the same thread, or a threadbusy on the thread masks out an incoming request. Similarly, any requests on higher-priority QoS levels mask out requests from threads that are at a lower QoS priority.

In an embodiment, a complex arbitration could involve a combination of the following inputs: valid or validvector from each branch, threadbusy or thread select, thread demote, as well as arbitration history that depends on previous arbitration decisions and the following additional input signals: epoch marker and lock arb. Depending on the configuration, an arbitration controller's arbitration unit includes only a subset of these input signals. Arbitration may happen in three tiers: by QoS group, by epoch, and finally by last service time (age). There are two types of epochs that govern weighted fairness between requesters: branch epochs are used per thread for requests from different arbitration controller input branches, and thread epochs are used for all requests mapping to different outgoing threads. In addition, every outgoing thread could be locked onto a particular branch, in which case no other incoming branch mapping to that outgoing thread is even considered for arbitration. The lock arb mechanism is used to take care of request interleaving, atomicity, and mutual exclusion (ReadEx) enforcement.

An example of the arbitration algorithm can be summarized with the following pseudo-code.

```
cancel epoch bits on incoming requests that have branch credit set
mask off requests to outgoing threads that have threadbusy or
threadselect set
if (any requests on non-demoted priority threads) {
mask off all requests not on non-demoted priority threads
}
else if (any requests on non-demoted allocated BW threads) {
mask off all requests not on non-demoted allocated BW threads
}
if (any requests left) {
for each (outgoing thread) {// intra-thread arb
if (this outgoing thread locked onto branch thread) {
if (any request from that branch thread) {
this is the winner for this outgoing thread
}
else {
no winner for this outgoing thread
}
}
else if (any requests for this outgoing thread) {
if (no requests without epoch bit set) {
roll over branch epoch
set outgoing epoch bit for this outgoing thread
}
else {
mask off requests for same outgoing thread with epoch
bit set
unset outgoing epoch bit for this outgoing thread
{
choose least recently serviced as winner for this outgoing
thread
}
}
}
// now do inter-thread arb
cancel outgoing epoch bits on outgoing thread winners that have
thread credit set
if (no outgoing thread winners without outgoing epoch bit set) {
roll over thread epoch
set outgoing epoch bit
}
else {
mask off outgoing thread winners with outgoing epoch bit set
unset outgoing epoch bit
}
choose least recently serviced as winner
}
else {
no winner
}
Once a request is the winner, the following arbitration controller-internal
state is updated:
• service order is updated for both inter-thread and branch
(intra-thread) arb
• if the winner caused the branch and thread epochs to roll over,
set the branch and thread credit bits for those branches and
outgoing threads that did not win
• if the winner did not cause the branch and thread epochs to roll over,
but the incoming request had the epoch bit set, unset the branch and
thread
credit bits for that branch and/or thread
• if the winner had lock arb asserted, lock arbitration for the
outgoing thread
```

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several systems in the form of S servers 104-1 through 104-S and C clients 108-1 through 108-C are connected to each other via a network 102, which may be, for example, an on-chip communication network. Note that alternatively the network 102 might be or include one or more of: inter-chip communications, an optical network, the Internet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 108-1 and 104-S can both initiate and respond to communications, their communication may be viewed as peer-to-peer. Likewise, communications between 104-1 and 104-S, and 108-1 and 108-C may be viewed as peer to peer if each such communicating device is capable of initiation and response to communication.

Referring back to FIG. 2, FIG. 2 illustrates a system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as an on-chip bus, a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Note that depending upon the actual implementation of the system, the system may include some, all, more, or a rearrangement of components in the block diagram. For example, an on-chip communications system on an integrated circuit may lack a display 220, keyboard 224, and a pointer 226. Another example may be a thin client might consist of a wireless hand held device that lacks, for example, a traditional keyboard. Thus, many variations on the system of FIG. 2 are possible.

The arbitration policy allows physical distribution without affecting arb properties, and is cascadable with and without intervening register points. The arbitration policy may implement regardless of whether all branches always have requests ready or not. The epoch marking allowing variable sized local groups of transaction can be used to control bandwidth mixing. The arbitration controller may be a physically distributable arbitration mechanism for on-chip networks that can incorporate multi-threading and quality-of-service features. The arbitration controller may distribute arbitration physically on the chip and incorporate high-value quality-of-service features, while still maintaining low cost in latency and logic gates. The arbitration controller may have cascaded arbitration units with and/or without intervening pipeline stages. The arbitration controller may provide distributed low-latency arbitration with quality-of-service features.

In an embodiment, a machine-readable medium may have stored thereon information representing the apparatuses and/or methods described herein. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's; electrical, optical, acoustical or other form of propagated signals (e.g., carrier waves, infrared signals, digital signals, EPROMs, EEPROMs, FLASH, magnetic or optical cards, or any type of media suitable for storing electronic instructions. Slower mediums could be cached to a faster, more practical, medium. The information representing the apparatuses and/or methods stored on the machine-readable medium may be used in the process of creating the apparatuses and/or methods described herein. For example, the information representing the apparatuses and/or methods may be contained in an Instance, soft instructions in an IP generator, or similar machine-readable medium storing this information.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), digital versatile disk (DVD), and magnetic-optical disks, read-only memories (ROMs), random access memories (RAMs), electrically programmable read-only memories (EPROM)s, electrically erasable programmable read-only. memories (EEPROMs), FLASH memories, magnetic or optical cards, etc., or any type of media suitable for storing electronic instructions either local to the computer or remote to the computer.

The details presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multi-processor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network. This communications network is not limited by size, and may range from, for example, on-chip communications to WANs such as the Internet.

While some specific embodiments of the invention have been shown the invention is not to be limited to these embodiments. For example, one skilled in-the art will recognize that multiple different circuit layouts and electronic components may be used to make the arbitration circuits. It is also possible to mark the last request in a group of transactions. Although the precise implementation of the arbitration unit is different when an end-of-epoch marker is used, the overall principle of group of transactions-based arbitration remains the same. The invention is to be understood as not limited by the specific embodiments described herein, but only by the scope of the claims.

The invention claimed is:

1. An apparatus, comprising:
an arbitration controller having a plurality of inputs that receive one or more transactions from a plurality of blocks of functionality, wherein the arbitration controller to arbitrate requests for access to a shared resource amongst the plurality of blocks of functionality by implementing an arbitration policy, wherein the arbitration policy to group the transactions from the plurality of blocks of functionality into global groups of transactions for servicing by that shared resource, wherein all of the transactions in a first global group are serviced by that shared resource prior to servicing transactions in a next global group of transactions; and
arbitration logic to facilitate the arbitration policy, wherein the arbitration logic comprises cascaded arbitration units that hierarchically arbitrate for the shared resource, and the topology of the functional blocks supplying the transactions to the inputs into the arbitration controller is capable of varying independently of the arbitration policy achieved by the collection of arbitration units.

2. The apparatus of claim 1, wherein the apparatus of claim 1 is located in a system on a chip.

3. The apparatus of claim 1, wherein the arbitration policy weights ordering of the transactions from the blocks of functionality within a global group based on a least-recently-serviced request factor.

4. The apparatus of claim 1, wherein the arbitration policy weights the transactions from the blocks of functionality based on a Quality of Service factor.

5. The apparatus of claim 1, wherein the arbitration policy weights the transactions from the blocks of functionality based on a multi-threaded link factor.

6. The apparatus of claim 1, wherein the arbitration logic includes branch arbitration logic and thread arbitration logic.

7. A machine-readable storage medium having tangibly stored thereon information including at least one of data and executable instructions that correlate to attributes of the apparatus of claim 1, which when executed by the machine, cause the machine to generate a representation of the apparatus of claim 1.

8. The apparatus of claim 1, further comprising:
a field configurable component upstream of the arbitration controller to attach an indication on transactions from one or more blocks of functionality to control the start and end points of a local grouping of transactions.

9. The apparatus of claim 1, further comprising:
a field configurable component upstream of the arbitration controller to attach indications on two or more transactions to ensure the shared resource services these indicated transactions sequentially.

10. The apparatus of claim 1, further comprising:
a component downstream of the arbitration controller to communicate to the arbitration logic to filter out of the arbitration process transactions serviced by that shared resource.

11. The apparatus of claim 1, wherein a given global group of transaction has approximately the same composition of transactions in that global group after implementing the arbitration policy independent of a topology of the arbitration units and pipelining between the arbitration units receiving the transactions to be included in the given global group of transactions.

12. The apparatus of claim 1, wherein the arbitration logic further comprises:
a status register to store a row and column pair history of service comparing a first branch to the other branches.

13. The apparatus of claim 12, wherein the arbitration logic further comprises:
a logic gate to receive a signal from each of the blocks of functionality supplying a transaction that indicates whether that branch should win the arbitration process; and
an inhibit logic gate to receive a signal from the status register and to provide an inhibit signal to the logic gate indicating whether the transaction from that block of functionality should win the arbitration process.

14. The apparatus of claim 1, further comprising:
a component downstream of the arbitration controller to communicate to the arbitration logic to dynamically demote a priority assigned to an incoming transaction.

15. The apparatus of claim 1, wherein a given transaction has approximately the same statistical percentage chance of being included in the first global group of transactions independent of a physical topology of the blocks of functionality supplying that transaction to an input of the arbitration controller.

16. A method, comprising:
arbitrating transactions to a shared resource amongst the plurality of blocks of functionality by implementing an arbitration policy;
grouping the transactions from the plurality of blocks of functionality into global groups of transactions for servicing by that shared resource, wherein all of the transactions in a first global group are serviced by that shared resource prior to servicing transactions in a next global group of transactions; and
maintaining substantially similar arbitration results for a composition of transactions included in the first global group independent of changes that occurred to a physical topology of blocks of functionality supplying transactions to be arbitrated.

17. The method of claim 16, further comprising:
prioritizing a service order of the transactions in the global group based on a least recently serviced factor.

18. The method of claim 16, further comprising:
locking two or more transactions from a first block of functionality to be serviced in sequential order in a global group of transactions that includes transactions from two or more blocks of functionality.

19. The method of claim 16, further comprising:
prioritizing a service order of the transactions in the global group based on a quality of service indication associated with the transactions.

20. The method of claim 16, further comprising:
arbitrating transactions from a multi-threaded link according to the arbitration policy.

21. The method of claim 16, further comprising:
communicating from a component downstream of a mechanism implementing the arbitration policy to dynamically demote a priority level assigned to a transaction to be arbitrated by the mechanism implementing the arbitration policy.

22. The method of claim 16, further comprising:
filtering out of the arbitration process transactions serviced by the shared resource when the shared resource is not ready to service transactions.

23. An apparatus, comprising:
means for arbitrating transactions to a shared resource amongst the plurality of blocks of functionality by implementing an arbitration policy;
means for grouping the transactions from the plurality of blocks of functionality into global groups of transactions for servicing by that shared resource, wherein all of the transactions in a first global group are serviced by that shared resource prior to servicing transactions in a next global group of transactions; and
means for maintaining substantially similar arbitration results for a composition of transactions included in the first global group independent of changes that occurred to the physical topology of blocks of functionality supplying transactions to be arbitrated, wherein the means for arbitrating transactions is communicably coupled to the means for grouping the transactions and the means for maintaining substantially similar arbitration results.

24. The apparatus of claim 23, further comprising:
means for prioritizing a service order of the transactions in the global group based on a least recently serviced factor, wherein the means for arbitrating transactions is communicably coupled to the means for prioritizing a service order.

25. The apparatus of claim 23, further comprising:
means for locking two or more transactions from a first block of functionality to be serviced in sequential order in a global group of transactions that includes transactions from two or more blocks of functionality, wherein the means for arbitrating transactions is communicably coupled to the means for locking two or more transactions.

26. The apparatus of claim 23, further comprising:
means for prioritizing a service order of the transactions in the global group based on a quality of service indication associated with the transactions, wherein the means for arbitrating transactions is communicably coupled to the means for locking two or more transactions.

27. The apparatus of claim 23, further comprising:
means for arbitrating transactions from a multi-threaded link according to the arbitration policy, wherein the means for arbitrating transactions from a multi-threaded link is communicably coupled to the means for the means for grouping the transactions and the means for maintaining substantially similar arbitration results.

28. The apparatus of claim 23, further comprising:
means for communicating from a component downstream of a mechanism implementing the arbitration policy to dynamically demote a priority level assigned to a transaction to be arbitrated by the mechanism implementing the arbitration policy, wherein the means for communicating is communicably coupled to the means for grouping the transactions.

29. The apparatus of claim 23, further comprising:
means for filtering out of the arbitration process transactions serviced by the shared resource when the shared resource is not ready to service transactions, wherein the means for arbitrating transactions is communicably coupled to the means for filtering out.

30. The apparatus of claim 23, wherein the apparatus of claim 1 is located in a system on a chip.

31. A machine-readable storage medium having tangibly stored thereon information including at least one of data and executable instructions that correlate to attributes of the apparatus of claim 1, which when executed by the machine, cause the machine to generate a representation of the apparatus of claim 23.

32. The apparatus of claim 23, further comprising:
means for communicating from a component external to a mechanism implementing the arbitration policy to dynamically determine an amount of individual transactions from a first block of functionality to be included in the first global group, wherein the means for communicating is communicably coupled to the means for grouping the transactions.

33. The apparatus of claim 23, further comprising:
means for completing the formation of the first global group without a transaction present from every block of functionality eligible to be included as part of the first global group of transactions, wherein the means for arbitrating transactions is communicably coupled to the means for completing the formation of the first global group.

34. The apparatus of claim 23, further comprising:
means for maintaining substantially similar arbitration results for the composition of transactions included in the first global group independent of whether pipeline register points are present in a mechanism implementing the arbitration policy, wherein the means for arbitrating transactions is communicably coupled to the means for grouping the transactions and the means for maintaining substantially similar arbitration results.

* * * * *